(12) United States Patent
Fujita et al.

(10) Patent No.: US 7,591,912 B2
(45) Date of Patent: Sep. 22, 2009

(54) INDUCTION HEAT TREATMENT METHOD, INDUCTION HEAT TREATMENT INSTALLATION AND INDUCTION-HEAT-TREATED PRODUCT

(75) Inventors: Takumi Fujita, Kuwana (JP); Nobuyuki Suzuki, Kuwana (JP)

(73) Assignee: NTN Corporation, Osaka (JP)

( * ) Notice: Subject to any disclaimer, the term of this patent is extended or adjusted under 35 U.S.C. 154(b) by 369 days.

(21) Appl. No.: 11/384,263

(22) Filed: Mar. 21, 2006

(65) Prior Publication Data

US 2006/0213588 A1 Sep. 28, 2006

(30) Foreign Application Priority Data

Mar. 23, 2005 (JP) .............................. 2005-083706

(51) Int. Cl.
*C21D 11/00* (2006.01)
(52) U.S. Cl. ........................ 148/511; 148/500; 148/567; 148/568; 148/569; 148/570; 148/571; 148/572; 148/573; 148/574; 148/575; 219/663; 219/664; 219/667
(58) Field of Classification Search ................ 148/500, 148/511, 567–575; 219/663, 664, 667
See application file for complete search history.

(56) References Cited

FOREIGN PATENT DOCUMENTS

| DE | 2901184 | * | 7/1980 |
| JP | 50-144154 | | 11/1975 |
| JP | 61-221326 | | 10/1986 |
| JP | 63-274713 | | 11/1988 |
| JP | 06-108144 | | 4/1994 |
| JP | 07-179952 | | 7/1995 |
| JP | 10-102137 | | 4/1998 |
| WO | WO 03/050826 A1 | | 6/2003 |

OTHER PUBLICATIONS

Hollomon, J., et al. "Time-temperature Relations in Tempering Steel" Trans. Met. Soc. AIME, 1945, 162, pp. 223-249.
Kawasaki, K., et al. "Effect of Induction Heating Tempering for Strengthening and Toughening of Spring Steel" Iron and Steel, 1988, vol. 74, pp. 334-341.
Kawasaki, K., et al. "Characteristics of Micro-structure of Induction Heating Tempered Spring Steel" Iron and Steel, 1988, vol. 74, pp. 342-349.
Japanese Office Action, with English translation, issued in Japanese Patent Application No. 2005-083706, mailed Mar. 17, 2009.

* cited by examiner

*Primary Examiner*—Sikyin Ip
(74) *Attorney, Agent, or Firm*—McDermott Will & Emery LLP

(57) ABSTRACT

An induction heat treatment method with which temperature control is enabled, condition setting is easy, and the quality of a treatment object can be stabilized includes: a data acquiring step of heating and quench-hardening a sample of the treatment object to thereby acquire process data; a storing step of storing the process data; a checking step of checking the power supply output transition data and the quenching timing data as to validity based on the temperature transition data stored in the storing step; and a mass production step of performing heat treatment of the treatment object in accordance with the power supply output transition data and the quenching timing data stored in the storing step and checked as to validity in the checking step.

3 Claims, 13 Drawing Sheets

$$D_{ep} = A_n \times \sqrt{2D\Delta t} \quad erf(A_n) = 1 - \frac{0.1573C_1}{C_n} \quad D = D_0 \exp(-Q/RT)$$

$C_1$: SOLID SOLUBILITY OF C AT 727°C: IN CASE OF SUJ2 = 0.52
$C_n$: SOLID SOLUBILITY OF C AT ARBITRARY TEMPERATURE

QUENCHING CONDITION $\quad D_{epn} = A_n \times 2 \sqrt{D_n \left[ \left( \frac{D_{epn-1}}{A_n \times 2\sqrt{D_n}} \right)^2 + \Delta t \right]} > D_{ep}*$ $$M_1 = M_0 - (M_0 - M_f)X\{T_1, \Delta t\}$$

CALCULATE $t_1^*$ REQUIRED FOR NEXT CALCULATION FROM $M_1 = M_0 - \{(M_0 - M_f) \times \{T_1, t_1^*\}$ $$M_2 = M_0 - (M_0 - M_f)X\{T_2, t_1^* + \Delta t\}$$

$$M_n = M_0 - (M_0 - M_f)X\{T_n, t_{n-1}^* + \Delta t\}$$

$$t_n^* = \sqrt[N]{\ln\left(\frac{M_0 - M_f}{M_n - M_f}\right) \times \left[A\exp\left(\frac{-Q}{RT}\right)\right]^{-N}}$$

INDUCTION HEAT TREATMENT METHOD, INDUCTION HEAT TREATMENT INSTALLATION AND INDUCTION-HEAT-TREATED PRODUCT

BACKGROUND OF THE INVENTION

1. Field of the Invention

The present invention relates to an induction heat treatment method, an induction heat treatment installation and an induction-heat-treated product, and more particularly, to an induction heat treatment method, an induction heat treated installation and an induction-heat-treated product wherein a treatment object is heated through induction heating to be heat-treated.

2. Description of the Background Art

An induction heat treatment furnace is advantageous over a controlled atmosphere heat treatment furnace in that the working environment of the heat treatment furnace is clean and that the products of small lots can efficiently be treated in a short time period.

Generally, in induction hardening of steel, the quenching is actually conducted while varying the quenching condition of electric power and time, and the quality of the treated product is checked to empirically set the quenching condition. In this case, the quenching condition must be set every time the type of treatment object is changed, and therefore there is a problem that it is troublesome to set the quenching condition. This problem is attributed to the difficulty in conducting heat treatment by control based on the heat treatment condition of temperature and time (the temperature control) in induction hardening.

Further, also from the viewpoint of controlling steel structure forming the treatment object, it is desirable that quenching is conducted based on the temperature control. However, in induction hardening, there are technical difficulties in the temperature measuring method and in the high-speed temperature control, and in the current state quenching based on the temperature control is not employed.

The reason why measuring temperature in induction hardening is difficult lies in the fact that, being different from heating through an atmosphere, the treatment object is directly heated by induction heating and therefore temperature must be measured directly from the treatment object, and that it is difficult to place a contact type thermometer since an induction heat treatment installation is often provided with a drive mechanism for moving the treatment object for homogeneously heating the treatment object.

Addressing such problems, use of a non-contact type thermometer such as a radiation thermometer may be contemplated. However, there has been a problem that a conventional radiation thermometer is slow in response speed and therefore not suitable for measuring the temperature of a treatment object in induction heat treatment. The increased signal output speed of a radiation thermometer and the improved temperature measuring precision based on the emissivity of a treatment object in recent years may provide possibility in high-speed temperature control using the radiation thermometer.

Even when induction hardening based on the temperature control is possible, as a result of conducting induction hardening that basically is partial heating, the temperature is uneven through the treatment object. Accordingly, the heat treatment quality may vary among portions in the treatment object. This poses a problem in applying induction hardening to through hardening (which hardens the treatment object evenly from the surface layer to the inside). In particular, a thick treatment object exhibits great temperature unevenness, and therefore it is likely to be involved with the problem. When treatment object cannot be heated homogeneously, some portions sufficiently heated may satisfy the desired heat treatment quality, while some portions not sufficiently heated may not.

In order to solve such problems, it may be contemplated to set sufficient heating time to thereby homogenize the treatment object in temperature by heat conduction. It may also be contemplated to use a power supply with relatively low frequency so that the magnetic flux deeply enters into the treatment object to achieve even heating. However, both of the methods have the same problem to be solve as to how the sufficient heating time can be determined.

On the other hand, a tempering process of steel is provided to a quenched product for improving the toughness and dimensional stability. In many cases, the condition of tempering is determined by temperature for each steel type, and generally the holding time is more or less varied according to the thickness of the products, since the effect of tempering is dominantly affected by the temperature rather than the holding time. In order to reduce the time of tempering process, a tempering process of high temperature and short time may be contemplated. Additionally, it is known conventionally that the effect of tempering can be calculated from tempering temperature T and tempering time t using tempering parameter P expressed by the following equation (see J. H. Hollomon and L. D. Jaffe, Trans. Met. Soc. AIME, 162, 1945, pp. 223-249).

$$P = T\{\log(t) + C\}$$

(C: constant)

The equation expresses the temperature and time required for attaining the desired quenching effect. The following equations expressing the relationship among material strength, tempering temperature and tempering time are known as more practical equations (see Japanese Patent Laying-Open No. 10-102137).

$$X = 1 - \exp\{-(kt)^N\}$$

$$K = A\exp(-Q/RT)$$

$$M = M_0 - (M_0 - M_f)X$$

(X: rate of change in mechanical properties, k: reaction rate coefficient, t: tempering time, N: time index, A: vibration factor term, Q: activation energy, R: gas constant, T: tempering temperature, M: hardness after tempering, $M_0$: hardness after quenching, Mf: hardness of raw material)

Although the effect of temperature and time on tempering can be known from the equations, generally a tempering process of high temperature and short time is not performed in the current state, in order not to invite uneven tempering in a heat treatment furnace. In many cases, a large quantity of treatment objects are processed at once in tempering. Accordingly, depending on the shape (thickness), processed quantity and the like of the treatment objects, the heating state in the heat treatment furnace may vary. Accordingly, as the heat treatment condition for tempering a large quantity of treatment objects at once, often a condition of relatively low temperature and long period is employed, according to which heating state is less likely to vary.

There is an induction heat treatment with which heat treatment of products is easily conducted individually, as a processing method suitable for tempering at high temperature and in a short time. As compared to tempering using a normal controlled atmosphere furnace, rapid heating tempering using induction heat treatment (induction tempering) is reported to be capable of providing a high-performance material property (see Kawasaki et al, "Iron and Steel", vol. 74, 1988, pp. 334-341 and pp. 342-349). However, induction tempering is not a very common tempering method. The reason may lie in the fact that temperature control is difficult in induction tempering and setting of the heat treatment condition is troublesome, similarly to the induction hardening.

As above, while the heat treatment such as quenching and tempering using induction heating has various advantages, it involves the problems that heat treatment based on the temperature control is difficult, and that troubles and experiences are required in setting a condition for stabilizing the quality of the treatment object. Further, it is required to reduce the manufacturing costs of induction-heat-treated products as treatment objects and to stabilize the quality thereof by solving the aforementioned problems to make the heat treatment condition setting easier.

SUMMARY OF THE INVENTION

Accordingly, an object of the present invention is to provide an induction heat treatment method and an induction heat treatment installation with which temperature control is enabled, condition setting is easy, and the quality of a treatment object can be stabilized. Further, another object of the present invention is to provide an induction-heat-treated product that is inexpensive and the quality thereof is stable.

An induction heat treatment method according to one aspect of the present invention is an induction heat treatment method for heating and quench-hardening a treatment object through induction heating, and it includes: a data acquiring step, a storing step, a checking step, and a mass production step. In the data acquiring step, a sample of the treatment object is heated and quench-hardened and process data is acquired. In the storing step, power supply output transition data on transition of a power supply output outputted from a power supply for induction heating to an induction coil in order to heat the sample of the treatment object in the data acquiring step, temperature transition data on transition of temperature of the sample of the treatment object, and quenching timing data for specifying a quenching timing of the sample of the treatment object are stored as the process data. In the checking step, the power supply output transition data and the quenching timing data are checked as to validity based on the temperature transition data stored in the storing step. In the mass production step, heat treatment of the treatment object is performed in accordance with the power supply output transition data and the quenching timing data stored in the storing step and checked as to validity in the checking step.

The data-acquiring step includes a temperature controlling step of adjusting the temperature of the sample of the treatment object, and a quenching controlling step of adjusting the quenching timing. The temperature controlling step has a heating step of heating the sample of the treatment object through induction heating, a temperature-measuring-for-controlling-temperature step of acquiring temperature data on a heated portion of the sample of the treatment object included in the temperature transition data, and a temperature adjusting step of outputting a temperature controlling signal to the power supply based on the temperature data acquired in the temperature-measuring-for-controlling-temperature step to control the power supply output to thereby adjust temperature for heating the sample of the treatment object. The quenching controlling step has a temperature-measuring-for-quenching step of acquiring temperature data on a portion away from the heated portion of the sample of the treatment object included in the temperature transition data, and a quenching timing adjusting step of adjusting a heating time based on the temperature data acquired in the temperature-measuring-for-quenching step and outputting a quench-starting signal.

Generally in induction hardening, first, the transition of a power supply output (a power supply output pattern) constituted by parameters of electric power and time is determined as a heating condition (the electric power control). The heating condition is determined by actually heating the sample of the treatment object, changing the power and the time while taking account of the shape, material and the like of the treatment object. Here, in quenching a steel product, it is necessary to keep the treatment object at a prescribed temperature for at least a prescribed time and to quickly cool it. However, in the above-described method (the electric power control), it is difficult to precisely know the heating history of the treatment object. Accordingly, the heating condition is empirically determined by examining the quality of the treatment object as to hardness, microstructure and the like. Thus, such incapability in precisely knowing the heating history of the treatment object and necessity for the experience and trouble in determining the heating condition have been the problems of the induction heat treatment.

On the other hand, according to the induction heat treatment method according to the one aspect of the present invention, heating of the treatment object is controlled with parameters of temperature and time in the data acquiring step (the temperature control). Accordingly, it is possible to precisely know the heating history of the treatment object, and to provide the treatment object with the necessary heating history and thereafter rapidly cool the same, to thereby achieve quenching. As a result, it is not necessary to examine the quality of the treatment object as to hardness, microstructure and the like that has been obtained through actual heat treatment, and therefore the above-described problems of the induction heat treatment can be solved.

Further, in the induction heat treatment method according to the one aspect, the heat treatment step by the above-described temperature control is applied to the data acquiring step, and it is not directly applied to the mass production step. The reason is explained in the following.

In the above-described step (data acquiring step), the temperature of the treatment object is measured by a thermometer to perform heat treatment by the temperature control. In order to perform the heat treatment so that the treatment object attains the target quality, the precision of temperature measurement is extremely important. Therefore, it is necessary to eliminate the effect of disturbance that may invite an error in the measurement. While a contact type thermometer such as a thermocouple may be employed as a thermometer, it is often difficult to measure the temperature of the treatment object by a contact type thermometer due to the layout of the heat treatment installation. In such a case, a non-contact type thermometer such as a radiation thermometer may be used. However, for example when there is dirt or a drop of water on the lens of the radiation thermometer, the measured temperature may involve a significant error (the effect of disturbance). Thus, particularly when a non-contact type thermometer is used, it is likely that some measures against disturbance must be taken.

On the other hand, according to the induction heat treatment method according to the one aspect, to be performed after the above-described step as a data acquiring step, a storing step of storing process data such as measured temperature data is provided. Then, a checking step of checking the stored process data as to validity is performed, and thereafter heat treatment of a mass production step is performed based on the process data with the verified validity. Thus, the effect of disturbance on the process data is eliminated, and the quality of the treatment object is stabilized. Thus, according to the induction heat treatment method according to the one aspect of the present invention, the temperature control is enabled, condition setting is easy, and the quality of a treatment object can be stabilized.

Preferably, in the induction heat treatment method according to the one aspect of the present invention, in the quenching timing adjusting step of the quenching controlling step, a diffusion length $D_{ep}$ of carbon for determining the quenching timing is obtained by the following equations:

$$D_{ep} = A \times 2(Dt)^{1/2} \qquad \text{equation (5)}$$

where D: diffusion constant of carbon in steel, t: holding time (second), A: correction coefficient;

$$D = D_0 \exp(-Q/RT)$$

where $D_0$: entropy term of diffusion constant, Q: activation energy, R: gas onstant, T: absolute temperature (K); and $$\text{erf}(A) = 1 - 0.1573 C_1/C_2$$

where $C_1$: solubility of C at 727° C., $C_2$: solubility of C at arbitrary temperature.

In order for the treatment object to attain the desired quality, it is necessary to control the temperature so that the property of the material at the portion where the temperature increases most rapidly (at the portion where the magnetic flux enters most easily) satisfies a prescribed quality (mainly as to hardness and retained austenite quantity), to determine if heating necessary for the remaining portion to achieve the prescribed quality has conducted, and to determine a quenching timing. Specifically, it is necessary to rapidly cool the treatment object in the state where C (carbon) is fully diffused in the steel and the quantity of solute C reaches the necessary quantity in every portion of the steel. Accordingly, in the quenching timing adjusting step of quenching controlling step, it is necessary to adjust the heating time so that such a condition is satisfied. The adjustment of the heating time, that is, determination of the quenching timing, can be conducted based on whether the diffusion length of C (carbon) reaches a certain diffusion length. This is based on the idea that the time for obtaining a homogeneous C solution in iron corresponds to the diffusion length of C. The diffusion length $D_{ep}$ of C can be expressed by the following equations.

$$D_{ep} = 2(Dt)^{1/2} \qquad \text{equation (1)}$$

$$D = D_0 \exp(-Q/RT) \qquad \text{equation (2)}$$

D: diffusion constant of carbon in steel, t: holding time (second), $D_0$: entropy term of diffusion constant, Q: activation energy, R: gas constant, T: absolute temperature (K)

The diffusion length $D_{ep}$ of C can be derived as a C distribution at certain time and position is expressed by the following equations.

$$C(x, t) = Cp - (Cp - C_0) \text{erf}[x/\{2(Dt)^{1/2}\})] \qquad \text{equation (3)}$$

$$\text{erf}(u) = 1 - 1/(1 + 0.07052u + 0.04228u^2 + 0.00927u^3 + 0.00015u^4 + 0.00028u^5 + 0.00043u^6)^{16} \qquad \text{equation (4)}$$

Here, the value of Cp is the value of C concentration at the position where C is supplied (in this case the interface between the matrix and the carbide), and $C_0$ is the quantity of C solution in the matrix before quenching, which is substantially 0%. As can be seen from the equations, the diffusion length $D_{ep}$ of C shows the distance where C(x, t) attains $C_1\{1 - \text{erf}(1)\} = 0.1573 C_1$ when Cp is constant.

However, as the diffusion length $D_{ep}$ of C is derived provided that the value of C concentration (the value of Cp) at the position where C is supplied (the interface between the matrix and the carbide) is constant, a correction is required when the value of Cp changes. Normally, the value of C concentration (the value of Cp) at the position where C is supplied (the interface between the matrix and the carbide) corresponds to the solid solubility of C, and therefore it changes as the temperature changes. Accordingly, when the temperature on the quenching controlling side changes every moment, it is necessary to correct the equation (1). On the other hand, the equation (5) for obtaining the diffusion length $D_{ep}$ of C (carbon) employs correction coefficient A to take into consideration of solid solubility $C_2$ of C at arbitrary temperature, to thereby corresponds to the change in C concentration due to the change in temperature. Thus, even when the temperature on the quenching controlling side changes every moment, the diffusion length $D_{ep}$ of C can be determined more precisely. As the diffusion length $D_{ep}$ of C can be determined more precisely, quenching can be started with more appropriate timing, whereby the quality of the product can be stabilized.

In the induction heat treatment method according to the one aspect, in the quenching timing adjusting step of the quenching controlling step, a solution state of carbon for determining the quenching timing may be obtained by the following equations.

$$\partial C/(\partial t) = D \partial C/(\partial x^2) \qquad \text{equation (6)}$$

D: diffusion constant of carbon in steel, C: carbon concentration (mass %), t: time (second), x: distance $$D = D_0 \exp(-Q/RT)$$

$D_0$: entropy term of diffusion constant, Q: activation energy, R: gas constant, T: absolute temperature (K)

Thus, the diffusion of C (carbon) can approximately be determined from the carbide in the treatment object, and the quantity of C solution can precisely be estimated. Thus, quenching can be conducted after the condition of C solution is satisfied. Additionally, as equation (6) is calculated not only on the temperature-measuring-for-quenching side but also on the temperature-measuring-for-controlling side, the quantity of retained austenite on the temperature controlling side (the heated portion of the sample of the treatment object) can also be estimated from the quantity of C solution.

An induction heat treatment method according to another aspect of the present invention is an induction heat treatment method for heating and tempering a treatment object through induction heating, and it includes a data acquiring step, a storing step, a checking step, and a mass production step. In the data acquiring step, a sample of the treatment object is heated and tempered and process data is acquired. In a storing step, power supply output transition data on transition of a power supply output outputted from a power supply for induction heating to an induction coil in order to heat the sample of the treatment object in the data acquiring step, temperature transition data on transition of temperature of the sample of the treatment object, and temper-ending timing data for specifying a temper-ending timing of the sample of the treatment object are stored as the process data. In the checking step, the power supply output transition data and the temper-ending timing data are checked as to validity based on the temperature transition data stored in the storing step. In the mass production step, heat treatment of the treatment object is performed in accordance with the power supply output transition data and the temper-ending timing data stored in the storing step and checked as to validity in the checking step.

The data acquiring step includes a temperature-controlling step of adjusting the temperature of the sample of the treatment object, and a temper-controlling step of adjusting the temper-ending timing. The temperature controlling step has a heating step of heating the sample of the treatment object through induction heating, a temperature-measuring-for-controlling-temperature step of acquiring temperature data on the sample of the treatment object included in the temperature transition data, and a temperature adjusting step of outputting a temperature controlling signal to the power supply based on the temperature data acquired in the temperature-measuring-for-controlling-temperature step to control the power supply output to thereby adjust temperature for heating the sample of the treatment object. The temper-controlling step has a temperature-measuring-for-tempering step of acquiring temperature data on the sample of the treatment object included in the temperature transition data, and a temper-ending timing adjusting step of adjusting a heating time based on the temperature data acquired in the temperature-measuring-for-quenching step and outputting a temper-ending signal.

In the induction tempering also, similarly to the above-described induction quenching, heating is normally performed by the electric power control. Here, in tempering a steel product, a prescribed heat is provided to the treatment object having been quench-hardened so that it softens and whereby toughness and dimensional stability are improved. Accordingly, similarly to the case of quenching, the electric power control involves problems of the incapability in precisely knowing the heating history of the treatment object and the necessity for experience and trouble in determining the heating condition.

On the other hand, according to the induction heat treatment method according to another aspect of the present invention, heat treatment by the temperature control is performed as a data acquiring step. Accordingly, it is possible to precisely know the heating history of the treatment object, and to provide the treatment object with the necessary heating history to achieve tempering. As a result, it is not necessary to examine the quality of the treatment object as to hardness, microstructure and the like that has been obtained through actual heat treatment, and therefore the above-described problems of the induction heating can be solved.

Further, in the induction heat treatment method according to the another aspect of the present invention, to be performed after the above-described step as a data acquiring step, a storing step of storing process data is provided. Then, a checking step of checking the stored process data as to validity is performed, and thereafter heat treatment of a mass production step is performed based on the process data with the verified validity. Thus, similarly to the case of quenching, the effect of disturbance on the process data is eliminated, and the quality of the treatment object is stabilized. As above, according to the induction heat treatment method according to the another aspect of the present invention, the temperature control is enabled, condition setting is easy, and the quality of a treatment object can be stabilized.

Preferably, in the induction heat treatment method according to the another aspect, in the temper-ending timing adjusting step of the temper-controlling step, a tempering time t for determining a temper-ending timing is obtained by the following equation.

$$t = [\ln\{(M_0-M_f)/(M-M_f)\} \times \{A\exp(-Q/RT)\}^{-N}]^{1/N} \quad \text{equation (7)}$$

t: tempering time (second), $M_0$: hardness after quenching, $M_f$: hardness of raw material, M: hardness after tempering, A: vibration factor term, Q: activation energy, R: gas constant, T: tempering temperature (K), N: time index Thus, the required and sufficient heat can be provided to the treatment object in tempering, and the quality of the product can be stabilized.

An induction heat treatment installation according to one aspect of the present invention is an induction heat treatment installation used in the method for heating and quench-hardening a treatment object through induction heating according to the one aspect of the present invention, and it includes: a temperature controlling apparatus for adjusting temperature of the treatment object; a quench-controlling apparatus for adjusting the quenching timing of the treatment object; and a storage apparatus for storing, as the process data, the power supply output transition data on transition of the power supply output outputted from the power supply for induction heating to the induction coil in order to heat the treatment object, the temperature transition data on transition of temperature of the treatment object, and the quenching timing data for specifying the quenching timing of the treatment object.

Employing the induction heat treatment installation according to the one aspect of the present invention, the temperature control is enabled, condition setting is easy, and the quality of a treatment object can be stabilized. Employing calculation based on equation (5) or (6) in the quench-controlling apparatus, the quality of the treatment object can further be stabilized. Further, employing the calculation based on equation (6) in the temperature controlling apparatus, the quantity of retained austenite on the temperature controlling side (the heated portion of the sample of the treatment object) can also be estimated from the quantity of C solution, whereby the quality of the treatment object can further be stabilized.

Preferably, in the induction heat treatment installation according to the one aspect, the temperature controlling apparatus has a heating apparatus heating the treatment object through induction heating, a temperature-measuring-for-controlling-temperature apparatus acquiring temperature data on a heated portion of the treatment object, and a temperature adjusting apparatus connected to the temperature-measuring-for-controlling-temperature apparatus for outputting a temperature controlling signal to the heating apparatus based on temperature information from the temperature-measuring-for-controlling-temperature apparatus. The quench-controlling apparatus has a temperature-measuring-for-quenching apparatus measuring temperature of a portion away from the portion heated by the heating apparatus, and a quenching timing adjusting apparatus connected to the temperature-measuring-for-quenching apparatus for adjusting a heating time based on temperature information from the temperature-measuring-for-quenching apparatus and outputting a quench-starting signal. Thus, condition setting becomes further easier, and the quality of a treatment object can be stabilized.

An induction heat treatment installation according to another aspect of the present invention is an induction heat treatment installation used in the method for heating and tempering a treatment object through induction heating according to the another aspect of the present invention, and it includes: a temperature controlling apparatus for adjusting temperature of the treatment object; a temper-controlling apparatus for adjusting the temper-ending timing of the treatment object; and a storage apparatus for storing, as the process data, the power supply output transition data on transition of the power supply output outputted from the power supply for induction heating to the induction coil in order to heat the treatment object, the temperature transition data on transition of temperature of the treatment object, and the temper-ending timing data for specifying the temper-ending timing of the treatment object.

Employing the induction heat treatment installation according to the another aspect of the present invention, the temperature control is enabled, condition setting is easy, and the quality of a treatment object can be stabilized. Employing the calculation based on equation (7) in the temper-controlling apparatus, the quality of the treatment object can further be stabilized.

Preferably, in the induction heat treatment installation according to the another aspect, the temperature controlling apparatus has a heating apparatus heating the treatment object through induction heating, a temperature-measuring-for-controlling-temperature apparatus acquiring temperature data on the treatment object, and a temperature adjusting apparatus connected to the temperature-measuring-for-controlling-temperature apparatus for outputting a temperature controlling signal to the heating apparatus based on temperature information from the temperature-measuring-for-controlling-temperature apparatus. The temper-controlling apparatus has a temperature-measuring-for-tempering apparatus acquiring temperature data on the treatment object, and a temper-ending timing adjusting apparatus connected to the temperature-measuring-for-tempering apparatus for adjusting a heating time based on temperature information from the temperature-measuring-for-tempering apparatus and outputting a temper-ending signal. Thus, condition setting becomes further easier, and the quality of a treatment object can be stabilized.

An induction-heat-treated product according to the present invention is manufactured through heat-treatment in the induction heat treatment method according to the one or the another aspect of the present invention. According to the induction-heat-treated product of the present invention, the price can be reduced and the induction-heat-treated product of stable quality can be provided, as the condition setting of heat treatment is easy.

As can be seen from the foregoing description, the induction heat treatment method and the induction heat treatment installation of the present invention can provide an induction heat treatment method and an induction heat treatment installation with which temperature control is enabled, condition setting is easy, and the quality of a treatment object can be stabilized. Further, the induction-heat-treated product of the present invention can provide an inexpensive induction-heat-treated product with stable quality.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
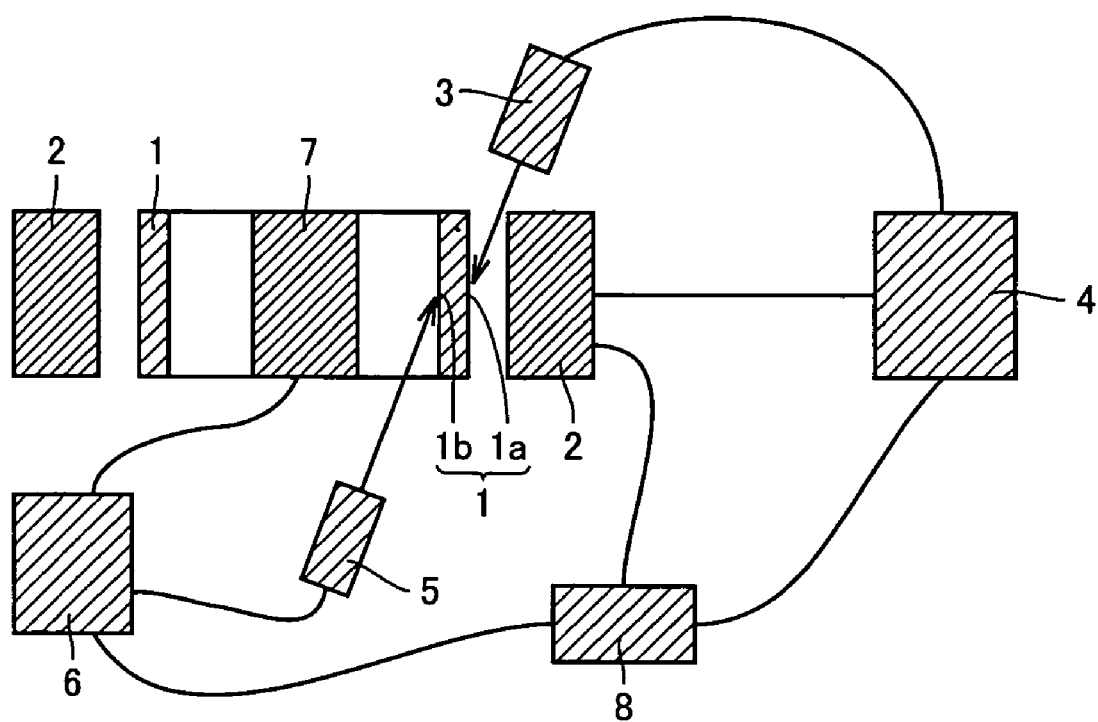
FIG. 1 is a schematic view showing a configuration of an induction heat treatment installation according to a first embodiment.

In the following, referring to the drawings, the present invention will be described in embodiments. Throughout the drawings, the identical or corresponding parts are denoted by the identical reference characters, and description thereof is not repeated.

First Embodiment

In the following, referring to the drawings, a first embodiment of the present invention will be described. Referring to FIG. 1, an induction heat treatment installation of the first embodiment is described.

Referring to FIG. 1, induction heat treatment installation of the first embodiment is for heating a treatment object 1 such as a bearing ring through induction heating and quench-hardening treatment object 1, and it includes a temperature controlling apparatus for adjusting the temperature of treatment object 1 being heated, a quench-controlling apparatus for adjusting a quenching timing of treatment object 1, and a storage apparatus 8 for storing process data in heat treatment.

The temperature controlling apparatus includes a heating apparatus 2 such as an induction coil for heating treatment object 1 through induction heating, a temperature-measuring-for-controlling-temperature apparatus 3 such as a thermometer (thermometer for controlling temperature) measuring the temperature of a portion 1a heated by heating apparatus 2, and a temperature adjusting apparatus 4 connected to temperature-measuring-for-controlling-temperature apparatus 3 for outputting a temperature controlling signal to heating apparatus 2 based on temperature information from temperature-measuring-for-controlling-temperature apparatus 3.

The quench-controlling apparatus includes a temperature-measuring-for-quenching apparatus 5 such as a thermometer (thermometer for controlling quenching) measuring the temperature of a portion 1b away from portion 1a heated by heating apparatus 2, and a quenching timing adjusting apparatus 6 connected to temperature-measuring-for-quenching apparatus 5 for adjusting a heat treatment time based on temperature information from temperature-measuring-for-quenching apparatus 5 to output a quench-starting signal to a quenching liquid injecting apparatus 7 and the like.

Storage apparatus 8 is connected to temperature adjusting apparatus 4, quenching timing adjusting apparatus 6 and heating apparatus 2 and configured to be capable of storing process data.

One of the features of the apparatus is provision of temperature-measuring-for-controlling-temperature apparatus 3 measuring the temperature of portion 1a heated by heating apparatus 2 and temperature-measuring-for-quenching apparatus 5 measuring the temperature of a portion 1b away from portion 1a heated by heating apparatus 2. In order to achieve more precise temperature control in induction heat treatment, it is desirable that temperature-measuring-for-controlling-temperature apparatus 3 measures the temperature at a location where an entering amount of magnetic flux is the maximum and an increase in the temperature is the maximum.

On the other hand, since heating employing high-frequency induction is partial heating by heating the surface layer of treatment object 1, there is temperature distribution in treatment object 1. Accordingly, the heat treatment quality may vary depending on the locations, which poses a problem in applying to the through hardening process. In particular, the temperature unevenness is significant with thick treatment object 1 and thus the problem is likely to be invited. Accordingly, in order to sufficiently provide heat treatment even to the low-temperature portion to satisfy a prescribed heat treatment quality, it is desirable that temperature-measuring-for-quenching apparatus 5 measures the temperature of a portion with less magnetic flux quantity and temperature increase, that is, a portion as far from the portion measured by temperature-measuring-for-controlling-temperature apparatus 3 as possible.

In the heat treatment method of the first embodiment, the shape of the heating coil and the frequency of the power supply are not limited, if the position of temperature-measuring-for-controlling-temperature apparatus 3 and temperature-measuring-for-quenching apparatus 5 satisfy the aforementioned condition. Additionally, a preferable manner is to provide a plurality of temperature-measuring-for-quenching apparatuses 5 for determining the timing of starting quenching from the viewpoint of reducing the effect of temperature unevenness in treatment object 1 and to ensure the heat treatment quality at a plurality of positions. The type of the thermometer used as temperature-measuring-for-quenching apparatus 5 may be a radiation thermometer, or it may be a contact type thermometer if the layout of the apparatus allows.

Figure 2:
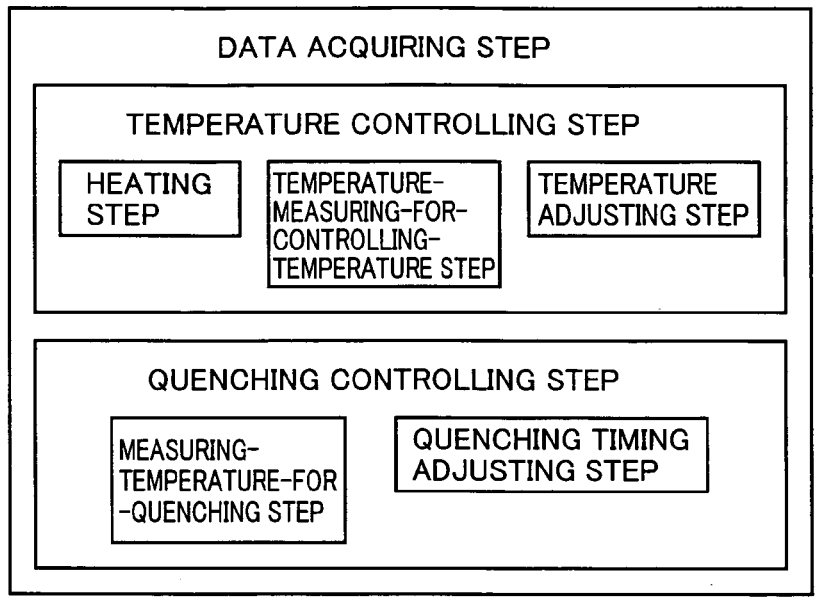
FIG. 2 shows a procedure of an induction heat treatment according to the first embodiment.
Figure 2:
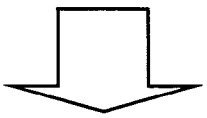
Figure 2:
Figure 2:
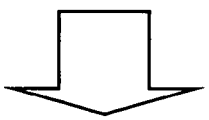
Figure 2:
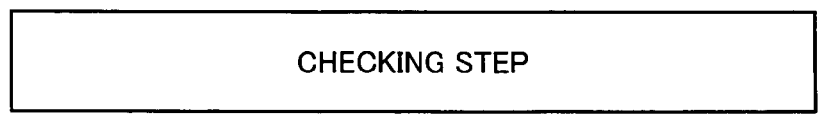
Figure 2:
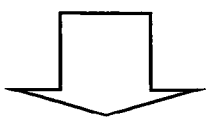
Figure 2:
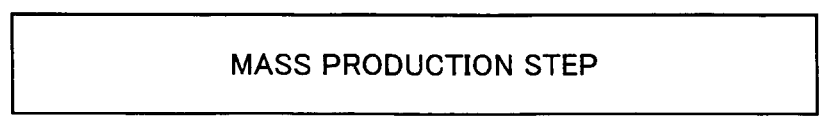

Next, referring to FIG. 2, the procedure of the induction heat treatment according to the first embodiment using the aforementioned heat treatment installation is described.

Referring to FIG. 2, the induction heat treatment method according to the first embodiment is for heating a treatment object through induction heating and quench-hardening the treatment object, wherein, first, a data acquiring step of acquiring process data by heating and quench-hardening a sample of a treatment object. The process data acquired in the data acquiring step is stored in a storing step. Additionally, a checking step of analyzing temperature transition data among the process data stored in the storing step and thereby determining presence/absence of the effect of disturbance for checking the validity of power supply output transition data and quenching timing data which are the process data stored in the storing step is performed.

Here, if there is the effect of disturbance, an abnormal value is recorded in the temperature transition data. Therefore, presence/absence of disturbance can be determined from the stored temperature transition data. Additionally, in order to determine more precisely, it is also possible to provide a contact type or non-contact type thermometer measuring the temperature of the same portion to determine presence/absence of disturbance based on the consistency between respective data. A specific determination scheme may be to determine that disturbance is present when the temperature difference between respective data shows at least 5%. While the determination of disturbance may be carried out by an operator checking the temperature transition data, another automated apparatus may carry out such determination. Specific examples may include a method of determining that disturbance is present when a differential value of the temperature transition of the stored temperature transition data shows at least 1000° C./sec or at most −1000° C./sec, or an apparatus wherein thermometers measuring the temperature of the same portion are provided as described above and disturbance is determined to be present when a difference of at least 5% between respective data is obtained.

Next, a mass production step is performed, wherein a power supply output is outputted in accordance with the power supply output transition data of which validity has been checked and quenching is performed in accordance with the quenching timing data of which validity has been checked.

Figure 3:
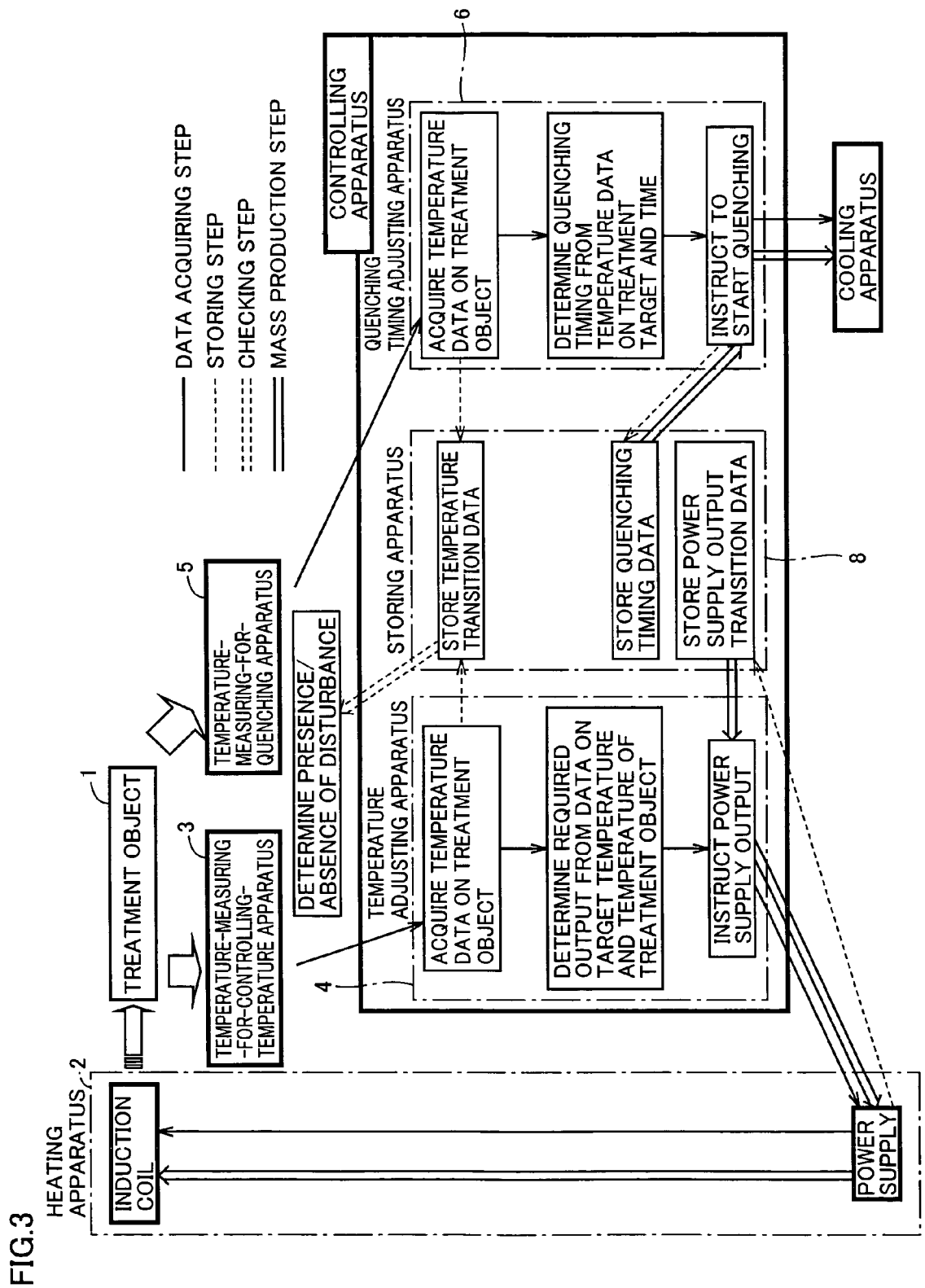
FIG. 3 shows a flow of data and instructions through each step of the induction heat treatment according to the first embodiment.

In FIG. 3, the flow of the data in the data acquiring step is indicated by a solid line arrow, the flow of the data in the storing step being indicated by a dashed line arrow, the flow of the data in the checking step being indicated by a double dashed line arrow, and the flow of data in the mass production step being indicated by a double solid line arrow. Referring to FIG. 3, the flow of data in each step of the induction heat treatment according to the first embodiment is described.

In the data acquiring step, the temperature data on the sample of treatment object 1 measured by temperature-measuring-for-controlling-temperature apparatus 3 is sent to temperature adjusting apparatus 4. Temperature adjusting apparatus 4 determines a required power supply output based on the target temperature of treatment object 1 and the temperature data on the sample of treatment object 1 being acquired, and instructs the power supply of heating apparatus 2 about a power supply output. The power supply being instructed outputs power to the induction coil of heating apparatus 2, and the sample of treatment object 1 is heated to the target temperature. On the other hand, the temperature data on the sample of treatment object 1 measured by temperature-measuring-for-quenching apparatus 5 is sent to quenching timing adjusting apparatus 6. Quenching timing adjusting apparatus 6 determines quenching timing based on the temperature of the sample of treatment object 1 being acquired and the heating time, and instructs a cooling apparatus such as quenching liquid injecting apparatus 7 to start quenching. Thus, the sample of treatment object 1 is rapidly cooled, and quench-hardened. Here, since the data acquiring step is performed based on temperature control, heating history of the sample of treatment object 1 is clear. Therefore, as far as the temperature data is correct, a proper heat treatment is performed and the treatment object of the target quality is obtained. As a result, it is not necessary to set the condition of heat treatment while checking the quality of the treatment object, and the condition setting is easily conducted.

In the storing step, the temperature data acquired by temperature adjusting apparatus 4 and quenching timing adjusting apparatus 6 in the data acquiring step are stored in storage apparatus 8 as the temperature transition data. The power supply output from the power supply of heating apparatus 2 to the induction coil is stored in storage apparatus 8 as power supply output transition data. The timing in the instruction for starting quenching outputted from quenching timing adjusting apparatus 6 to a cooling apparatus such as quenching liquid injecting apparatus 7 is stored in storage apparatus 8 as quenching timing data. Here, the quenching timing is stored for example as the time since heating was started.

In the checking step, for example thermometers capable of measuring the same portions as temperature-measuring-for-controlling-temperature apparatus 3 and temperature-measuring-for-quenching apparatus 5, respectively, are provided, and the temperature of the portions is measured. Based on the comparison between this measured temperature data and the temperature transition data measured by temperature-measuring-for-controlling-temperature apparatus 3 and temperature-measuring-for-quenching apparatus 5 and stored in storage apparatus 8, presence/absence of disturbance is determined.

In the mass production step, based on power supply output transition data and quenching timing data stored in the storing step and checked as to validity in the checking step, treatment object 1 is heated and quenching is performed. Here, the mass production step is not performed based on real-time temperature data from temperature measuring apparatuses 3 and 5 that might be affected by disturbances, but by electric power control based on the power supply output transition data and quenching timing data having been checked as to validity. Thus, an induction-heat-treated product of stable quality can be obtained.

It is noted that while apparatuses respectively realizing the functions of temperature adjusting apparatus 4, storage apparatus 8 and quenching timing adjusting apparatus 6 may be provided, such functions can be realized by a controlling apparatus such as one personal computer. The steps can be executed, for example, with a single or a plurality of program(s) corresponding to respective steps using a personal computer as a controlling apparatus.

Next, the induction heat treatment method of the first embodiment using the above-described induction heat treatment installation is specifically described, exemplarily showing an outer ring of JIS 6206 type (JIS: Japanese Industrial Standard) made of SUJ2 as treatment object 1.

Here, as the standard value of SUJ2 material, it is defined that hardness after tempering (hardness after tempering) when tempered at 180° C. is at least HRC 58 from the viewpoint of strength, and a retained austenite quantity is at most 12 volume % from the viewpoint of dimensional stability.

Figure 4:
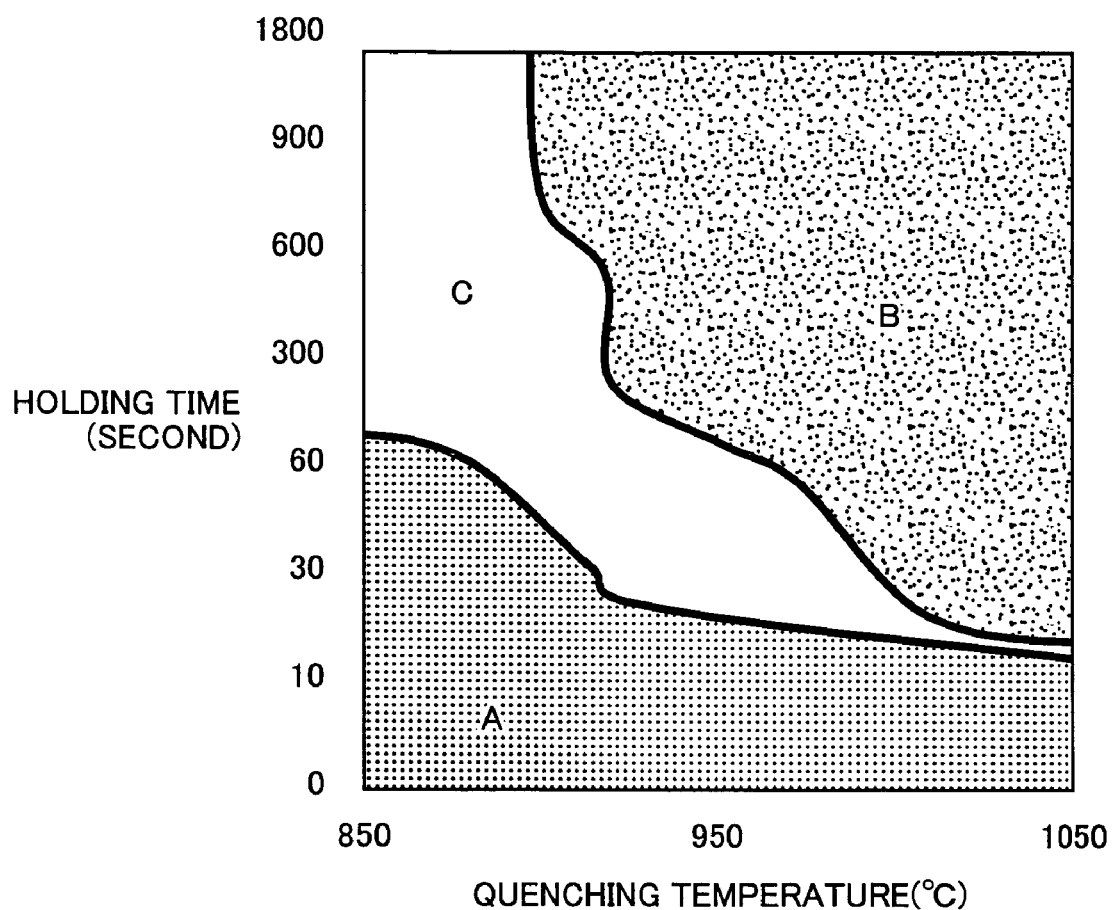
FIG. 4 is a TTA diagram of SUJ2 material showing the relationship between quenching temperature and holding time.

In FIG. 4, the axis of abscissas represents quenching temperature (° C.) and the axis of ordinates represents holding time (second). A region A represents a range wherein the hardness standard is not satisfied, a region B representing a range wherein retained austenite quantity standard is not satisfied, and a region C representing a range wherein either of the heat treatment quality standards are satisfied.

As can be seen from FIG. 4, the hardness standard is more likely to be satisfied as the quenching temperature and the holding time increase. On the other hand, the austenite quantity standard is less likely to be satisfied as the quenching temperature and the holding time increase. In order to satisfy the heat treatment quality standard (the hardness standard and the retained austenite quantity standard), it is easier to control the heat treatment quality with a condition setting of relatively low temperature and a long time. For example, in a treatment at a relatively high temperature of 1050° C., the holding time for ensuring the heat treatment quality standard is at least 15 seconds, and the holding time of 17 seconds or more fails to satisfy the standard. In contrast, in a treatment at 950° C., the holding time for ensuring the heat treatment quality is at least 20 seconds, and the standard can be satisfied up to 60 seconds. In order to take the advantage of quick treatment of the induction heat treatment, it is desirable to conduct the processing with the highest possible temperature and the shortest possible time.

The temperature transition in the temperature measuring position of temperature-measuring-for-controlling-temperature apparatus 3 can be determined by the balance between reduction in the heat treatment time and ease of control. If the relation diagram (TTA diagram) of quenching temperature and holding time for the heat treatment quality corresponding to the type of material can be prepared, then the condition can be determined according to the diagram. Hence, the induction heat treatment installation according to the first embodiment can be used irrespective of the type of material.

When the heat treatment condition is determined, as shown in FIG. 1, the heat treatment condition is input to temperature adjusting apparatus 4 such as a personal computer. Temperature adjusting apparatus 4 is connected to temperature-measuring-for-controlling-temperature apparatus 3 and heating apparatus 2. Based on temperature information from temperature-measuring-for-controlling-temperature apparatus 3, it outputs a temperature controlling signal by PID (Proportional Integral Differential) control to heating apparatus 2, and can control the temperature transition of temperature measured portion 1a measured by temperature-measuring-for-controlling-temperature apparatus 3. At the same time, the temperature measurement data from temperature-measuring-for-quenching apparatus 5 is taken into quenching timing adjusting apparatus 6 such as a personal computer. Based on the temperature transition, whether heating is sufficient is determined to adjust the quenching timing. Determination of quenching timing is made considering whether the temperature transition of temperature measured portion 1b measured by temperature-measuring-for-quenching apparatus 5 falls within the standard on the TTA diagram. It is noted that temperature adjusting apparatus 4 and quenching timing adjusting apparatus 6 can be realized by one personal computer.

In determining whether the temperature transition falls within the standard on the TTA diagram, although the following equations (1) and (2) may be employed, preferably equation (5), which is a modification of equation (1) taking into account of the temperature on quenching controlling side changing every moment, as well as equation (2) are employed.

$$D_{ep}=2(Dt)^{1/2} \quad \text{equation (1)}$$

$$D_{ep}=A \times 2(Dt)^{1/2} \quad \text{equation (5)}$$

D: diffusion constant of carbon in steel, t: holding time (second), A: correction coefficient $$D=D_0 \exp(-Q/RT) \quad \text{equation (2)}$$

$D_0$: entropy term of diffusion constant, Q: activation energy, R: gas constant, T: absolute temperature (K)

Here, the value of correction coefficient A is obtained from the following equation (8).

$$\text{erf}(A)=1-0.1573 C_1/C_2 \quad \text{equation (8)}$$

$C_1$: solid solubility of C at 727° C. (in a case of SUJ2: 0.52)
$C_2$: solid solubility of C at arbitrary temperature Equation (5) is for calculating diffusion length $D_{ep}$ of C when $C_1$ in equation (8) is replaced by $C_2$. The value of $C_2$ is the solid solubility of C at any temperature, and these values can be determined in advance empirically or from thermodynamic equilibrium calculation. It is assumed that quenching is performed when $D_{ep}$ in equation (5) reaches a certain value ($D_{ep}*$).

Temperature measured portion 1b measured by temperature-measuring-for-quenching apparatus 5 may not necessarily be one. From the viewpoint of quality control, a plurality of the temperature measured portions are desirable as the heat treatment quality at a plurality of positions is ensured.

Figure 5:
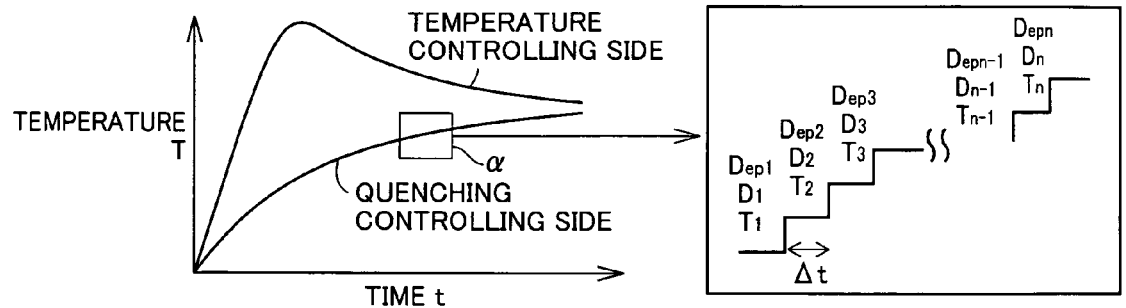
FIG. 5 is an explanatory diagram showing the relationship between quenching temperature and holding time for explaining a method for integrating values of corrected $D_{ep}$ from the temperature transition.

The upper left graph of FIG. 5 indicates the temperature transition on temperature controlling side and quenching controlling side, wherein the axis of abscissas represents time t and the axis of ordinates represents temperature T. The upper right diagram is an enlarged view of region α in the upper left graph. Below them, equations for integrating the value of corrected $D_{ep}$ from the temperature transition are shown.

Actually, the temperature transition of the temperature measured portion (that is, the portion measured by temperature-measuring-for-quenching apparatus 5) that determines the quenching timing changes every moment, the value of $D_{ep}$ must be integrated as $D_{ep\_1} \rightarrow D_{ep\_2} \rightarrow D_{ep\_n}$, as shown in FIG. 5. When temperature increase of treatment object 1 is started, since the entrance of magnetic flux on quenching controlling side is smaller than on the temperature controlling side, the temperature increase pattern on the quenching controlling side is delayed as compared to the temperature controlling side. Normally, if the temperature exceeds 727° C., iron starts to be austenitized. When the temperature increase rate is fast, the heating transformation temperature changes. Accordingly, the temperature for calculating the diffusion length must be changed depending on the temperature increase rate.

As the temperature increase rate is different depending on the capacity of the power supply, the shape of coil and treatment object and the like, it is preferable to change the temperature increase rate as appropriate by the type of apparatuses and treatment object. From the point where the temperature of the quenching controlling side exceeds the heating transformation temperature, diffusion length $D_{ep}$ calculated by the equation in the drawing. When $D_{ep\_n}$ at any time exceeds $D_{ep}*$, quenching is started immediately. Desirably, the value of $D_{ep}*$ is as small as possible in a range wherein prescribed heat treatment quality can be maintained, from the viewpoint of reducing heat treatment time. However, it is desirable to have a setting value with a certain allowance from the viewpoint of stabilized quality.

Figure 6:
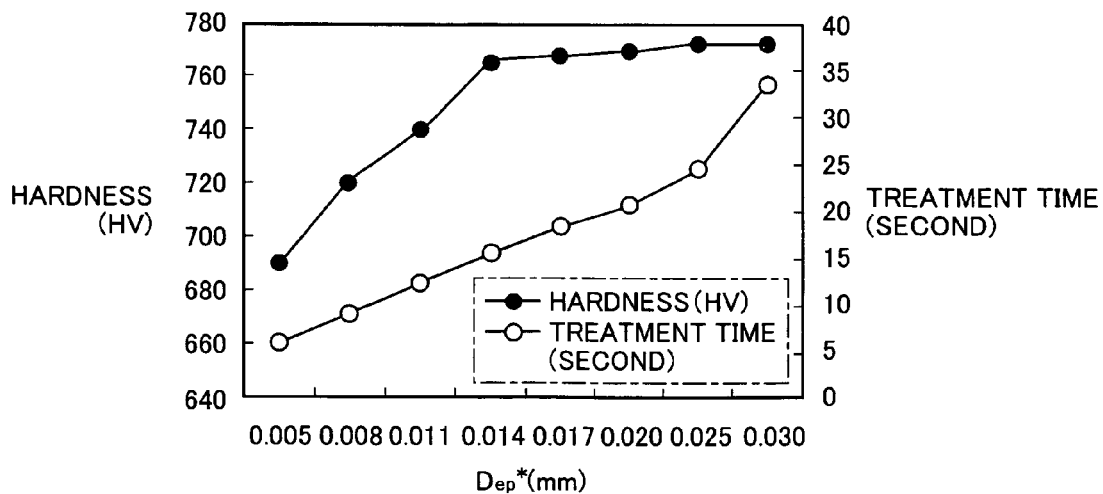
FIG. 6 shows changes in hardness and treatment time relative to $D_{ep}^*$ value.

The change in hardness and treatment time for the value of $D_{ep}*$ is shown in FIG. 6. It is noted that FIG. 6 shows the relationship with the following condition. Maximum temperature: 900° C., decrease-temperature rate: 0° C./second, tempering condition after quenching: 180° C.×120 min. In FIG. 6, the axis of abscissa indicates $D_{ep}*$ value (mm) and the axis of ordinates indicates hardness (HV) and treatment time (second). The black circle represents hardness, and white circle represents treatment time.

Referring to FIG. 6, it can be seen that the treatment time increases as greater $D_{ep}*$ is set, since the required diffusion length increases. It can be seen that the hardness increases as greater $D_{ep}*$ is set, since the treatment increases. However, as to hardness, excessively long heating results in a saturated region, and reaches the maximum hardness with $D_{ep}*$ of about 0.015 mm. Therefore, $D_{ep}*$ of at most 0.015 mm may be desirable.

Second Embodiment

Next, the second embodiment of the present invention is described. An induction heat treatment method, an induction heat treatment installation and an induction-heat-treated product are configured basically the same as in the above-described first embodiment. However, the second embodiment is different in that the flowing equations (6) and (2) are employed in determining whether temperature transition of temperature measured portion 1b measured by temperature-measuring-for-quenching apparatus 5 falls within the standard on a TTA diagram. In the following, a method of determining whether the temperature transition falls within the standard on the TTA diagram using equations (6) and (2) is described.

$$\partial C/(\partial t)=D\partial^2 C/(\partial x^2) \quad \text{equation (6)}$$

D: diffusion constant of carbon in steel, C: carbon concentration (mass %), t: time (second), x: distance $$D=D_0 \exp(-Q/RT) \quad \text{equation (2)}$$

$D_0$: entropy term of diffusion constant, Q: activation energy, R: gas constant, T: absolute temperature (K)

Equation (6) is expressed as follows in a difference equation.

$$C_{m,n+1}=rC_{m+1,n}+(1-2r)C_{m,n}+rC_{m-1,n} \quad \text{equation (9)}$$

$$R=D \times \Delta t/(\Delta X)^2 \quad \text{equation (10)}$$

By solving equation (9) with a certain boundary condition to see whether the solution state of carbon in the material satisfies a prescribed condition. The boundary condition is provided by defining C solid solubility with the concentration of C at two points of one dimension (hereinafter referred to as "boundary point"). This is a model for approximately determining diffusion of C from two carbides in steel.

Figure 7A:
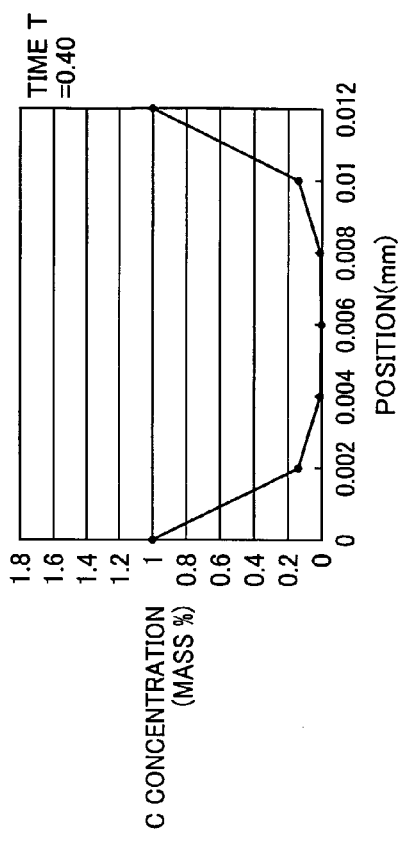
FIG. 7A shows the temperature transition of the treatment object.
Figure 7B:
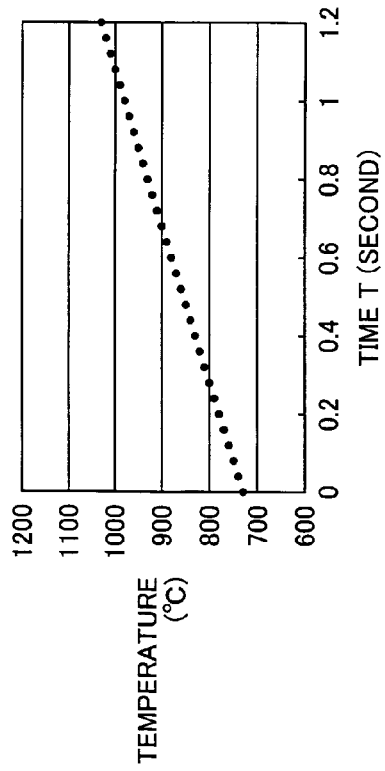
FIG. 7B shows C distribution (distribution of solute carbon concentration (mass %)) at each position between two boundary points when time T in the temperature transition in FIG. 7A is 0.4.
Figure 7C:
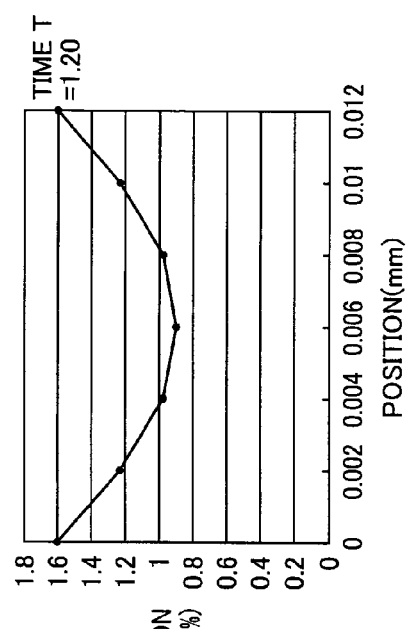
FIG. 7C shows C distribution (distribution of solute carbon concentration (mass %)) at each position between two boundary points when time T in the temperature transition in FIG. 7A is 0.8.
Figure 7D:
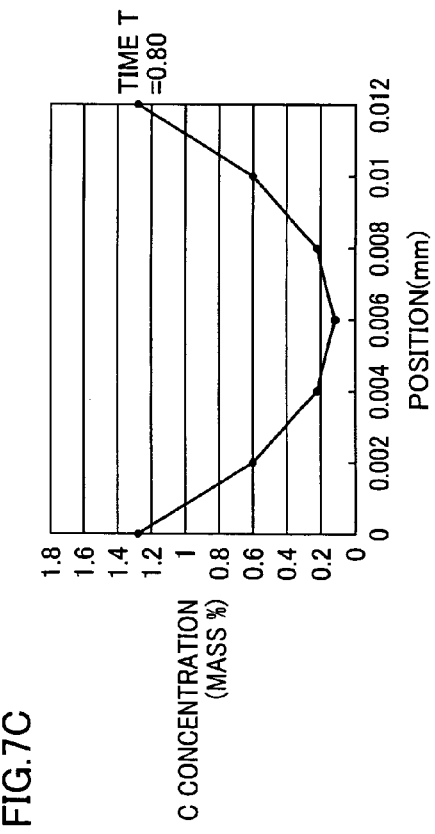
FIG. 7D shows C distribution (distribution of solute carbon concentration (mass %)) at each position between two boundary points when time T in the temperature transition in FIG. 7A is 1.2.

In FIG. 7A, the axis of abscissas indicates time (second) and the axis of ordinates indicates temperature (° C.). In FIGS. 7B-7D, the axis of abscissas indicates distance (position) (mm) from a boundary point of the reference and the axis of ordinates indicates C concentration (mass %). In calculating the solution state of carbon, the distance between two boundary points (distance between carbides) was defined as 0.012 mm, and the value of C at boundary points (the value of C concentration (mass %)) was defined as the value of a solubility curve of SUJ2 (calculated using thermodynamic equilibrium calculation software). The equation of solid solubility curve (solid solubility equation) can be determined in advance for each material, either empirically or by thermodynamic equilibrium calculation.

From FIGS. 7B-7D, it can be seen that the distribution of carbon concentration held in solid solution (solute carbon concentration) changes as time elapses. In the method according to the second embodiment, the quenching starting timing is determined based on whether C concentration at the central position in the solute carbon concentration distribution (when the distance between two boundary points (carbide distance) is 0.012 mm, the position at 0.006 mm) reaches a prescribed C concentration. Additionally, it is desirable to set the setting value of C concentration for starting quenching in the central position to be 0.6-0.8 mass % considering the balance between hardness and retained austenite quantity. Further, it is desirable to change the distance between two boundary points (carbide distance) as appropriate depending on the structure of the treatment object before quenching and the difference among the materials.

Specifically, the quenching start temperature of the second embodiment is determined as follows, for example. First, the temperature on the quenching controlling side is measured by temperature-measuring-for-quenching apparatus 5 (step A), and C quantity in the boundary portion is calculated based on the measured temperature (step B). The value of C quantity in the boundary portion is assigned to the boundary condition of equation (9) to solve equation (9) (step C). From the foregoing steps, the distribution of solute carbon concentration as shown in FIGS. 7B-7D can be calculated (step D). From the obtained distribution of solute carbon concentration, whether the C concentration at the central position in the distribution of solute carbon concentration reaches a prescribed C concentration (for example, 0.6-0.8 mass %) is checked (step E). If the C concentration in the central position reaches the prescribed C concentration, quenching is started (step F). Otherwise, quenching is not started and heating is continued, and the process goes back to step A again.

Equation (9) in step C is solved specifically as follows. First, C concentration at opposing ends of C distribution in FIGS. 7B-7D is C concentration of carbide-matrix interface. Accordingly, from this position, C is supplied to the matrix in a certain concentration (solid solubility of carbon). In order to provide equation (9) with this condition, it is necessary to substitute a certain concentration (solid solubility of carbon) into the value of $C_{0,n}$ and $C_{M,n}$ (the positions of 0 and 0.012 in FIGS. 7B-7D).

As to this calculation method referred to as the difference method, with five points of division of the space (seven points including the boundary points) as shown in FIGS. 7B-7D, five simultaneous equations are obtained, wherein unknowns are seven, namely, $C_{0,n}$, $C_{1,n}$, $C_{2,n}$, $C_{3,n}$, $C_{4,n}$, $C_{5,n}$, and $C_{6,n}$. Among them, $C_{0,n}$, and $C_{6,n}$ are the positions of carbide-matrix interface, C concentration value can be provided from a solid solubility equation. Thus, as the simultaneous equations are five and the unknowns are five, $C_{1,n}$, $C_{2,n}$, $C_{3,n}$, $C_{4,n}$, $C_{5,n}$, can be obtained.

Specifically, equation (9) cannot be solved unless the condition of C concentration at two points is provided. Therefore, by providing the condition of C concentration at the two points from the solid solubility equation, equation (9) can be solved.

Figure 8:
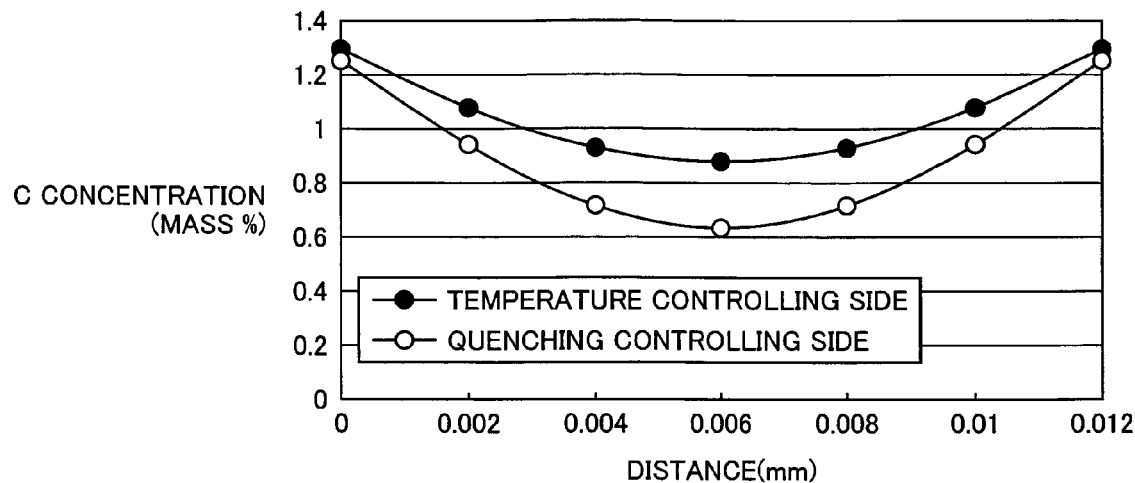
FIG. 8 shows distribution of solute carbon concentration on temperature controlling side and on quenching controlling side when quenching is conducted according to a method of a second embodiment.

The calculation of solute carbon concentration is performed not only on the quenching controlling side but also on the temperature controlling side. This is for estimating a retained austenite quantity on the temperature controlling side from the solution state of carbon on the temperature controlling side. In FIG. 8, the axis of abscissas indicates distance (position) (mm) from a boundary point of the reference, and the axis of ordinates indicates C concentration (mass %). This data is obtained when quenching temperature is constant at 950° C., a temperature increase rate up to a quenching temperature is 300° C./sec, a distance between carbides is 0.012 μm, and quenching condition is C concentration of 0.6 mass % at the central position. It can be seen from FIG. 8 that the solute carbon concentration value is generally higher on the temperature controlling side than on the quenching controlling side. This is because the temperature of treatment object 1 on the temperature controlling side near heating apparatus 2 is higher than on the quenching controlling side.

The temperature for starting calculation of the aforementioned solute carbon concentration must be determined taking into account of the temperature increase rate of the treatment object as to both the quenching controlling side and the temperature controlling side. In the following, the determination method is described.

Figure 9:
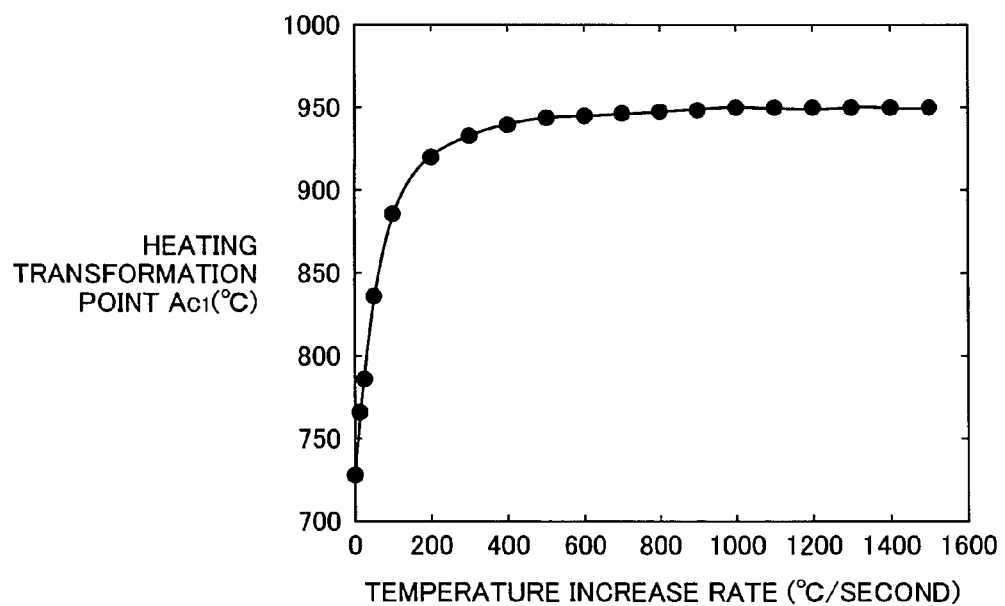
FIG. 9 shows changes in heating transformation point by a temperature increase rate in steel of one mass % C.

Normally, when the temperature exceeds 727° C., iron starts to be austenitized. The heating transformation temperature changes if the temperature increase rate is high. Therefore, the temperature for starting the calculation must be changed by the temperature increase rate. In FIG. 9, the axis of abscissa indicates temperature increase rate (° C./sec), and the axis of ordinates indicates heating transformation point Ac1 (° C.). From FIG. 9, it can be seen that, as the temperature increase rate changes, heating transformation point Ac1 changes from 727° C. to 950° C. Accordingly, by checking in advance the change of heating transformation point Ac1 relative to the change of temperature increase rate in the composition of treatment object 1, and determining heating transformation point Ac1 from the temperature increase rate in heating treatment object 1, the temperature for starting calculation of the solute carbon concentration can be determined based on the heating transformation point Ac1.

Figure 10:
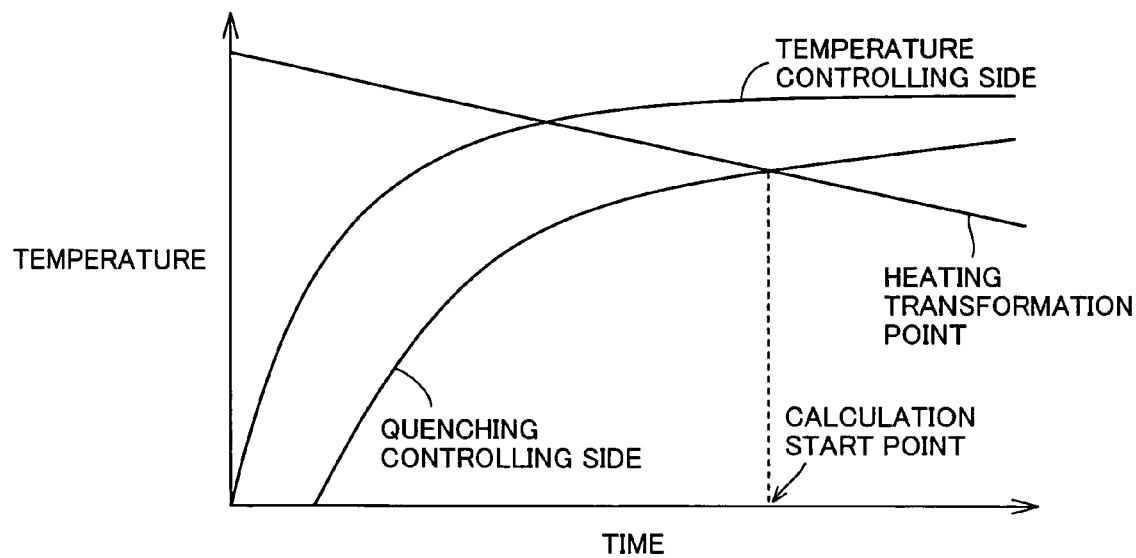
FIG. 10 is an explanatory diagram for explaining a method for determining a temperature for starting calculation of solute carbon concentration when the temperature increase rate is considered.

In FIG. 10, the axis of abscissa indicates time and the axis of ordinates indicates temperature. In FIG. 10, the temperature transition on the temperature controlling side (temperature measured portion 1a measured by temperature-measuring-for-controlling-temperature apparatus 3 in FIG. 1), the temperature transition on the quenching controlling side (temperature measured portion 1b measured by temperature-measuring-for-quenching apparatus 5 in FIG. 1), and heating transformation point Ac1 are shown.

In an initial stage of heating, as heating on the temperature controlling side is rapidly performed, the temperature increase rate on the quenching controlling side also becomes fast, and the heating transformation point becomes high. When the temperature on the temperature controlling side approaches a prescribed temperature, heating is controlled by temperature adjusting apparatus 4 so that the temperature increase rate becomes moderate. Accordingly, the temperature increase rate on the quenching controlling side also becomes moderate, and heating transformation point Ac1 decreases. Then, as the time elapses, heating transformation point Ac1 crosses the temperature transition of quenching controlling side. As this intersection point represents the temperature at which austenitizing starts, the calculation of the solute carbon concentration can be started from this temperature (that is, the temperature at which austenitizing starts).

Then, after the heating is started and when the C concentration at the central position in the solute carbon concentration distribution exceeds a prescribed C concentration (for example, 0.6-0.8 mass %), quenching is immediately started at this time point, as described with reference to FIG. 7.

Third Embodiment

Next, referring to the drawings, a third embodiment of the present invention is described. First, referring to FIG. 11, an induction heat treatment installation according to the third embodiment is described.

Figure 11:
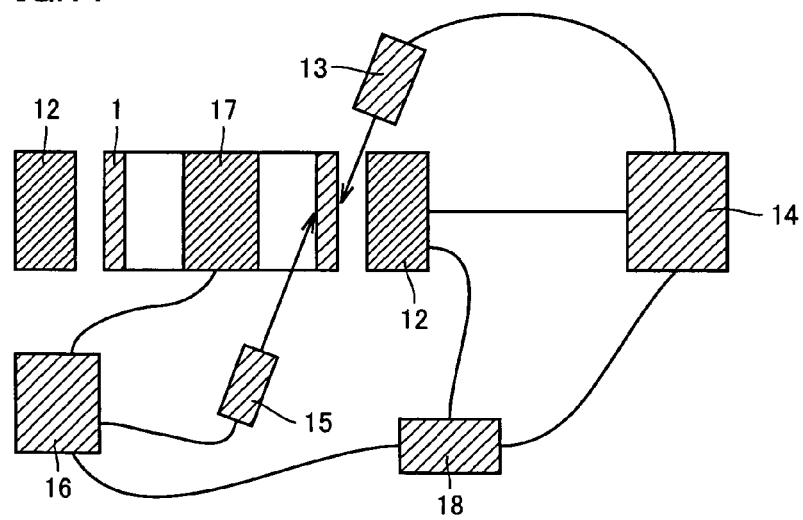
FIG. 11 is a schematic view showing a configuration of an induction heat treatment installation according to a third embodiment.

Referring to FIG. 11, the induction heat treatment installation of the third embodiment is for heating a treatment object 1 such as a bearing ring through induction heating and tempering treatment object 1, and it includes a temperature controlling apparatus for adjusting the temperature of treatment object 1 being heated, a temper-controlling apparatus for adjusting timing of ending tempering of treatment object 1, and a storage apparatus 18 for storing process data in heat treatment.

The temperature controlling apparatus includes a heating apparatus 12 such as an induction coil for heating treatment object 1 by induction heating, a temperature-measuring-for-controlling-temperature apparatus 13 such as a thermometer (thermometer for controlling temperature) measuring the temperature of treatment object 1 heated by heating apparatus 12, and a temperature adjusting apparatus 14 connected to temperature-measuring-for-controlling-temperature apparatus 13 for outputting a temperature controlling signal to heating apparatus 12 based on temperature information from temperature-measuring-for-controlling-temperature apparatus 13.

The temper-controlling apparatus includes a temperature-measuring-for-tempering apparatus 15 such as a thermometer (thermometer for controlling tempering) measuring the temperature of treatment object 1 heated by heating apparatus 12, and a temper-ending timing adjusting apparatus 16 connected to temperature-measuring-for-tempering apparatus 15 for adjusting a heat treatment time based on temperature information from temperature-measuring-for-tempering apparatus 15 to output a temper-ending signal to a temper-ending apparatus such as coolant injecting apparatus 17 and the like.

Storage apparatus 18 is connected to temperature adjusting apparatus 14, temper-ending timing adjusting apparatus 16 and heating apparatus 12 and configured to be capable of storing process data.

According to the heat treatment method of the third embodiment, the shape of the heating coil and the frequency of the power supply are not limited as long as temperature-measuring-for-controlling-temperature apparatus 13 and temperature-measuring-for-tempering apparatus 15 satisfy the aforementioned condition. Additionally, a preferable manner is to provide a plurality of temperature-measuring-for-tempering apparatus 15 for determining the timing of ending tempering from the viewpoint of reducing the effect of temperature unevenness in treatment object 1 and to ensure the heat treatment quality at a plurality of positions. The type of the thermometer used as temperature-measuring-for-tempering apparatus 15 may be a radiation thermometer, or it may be a contact type thermometer if the layout of the apparatus allows.

Figure 12:
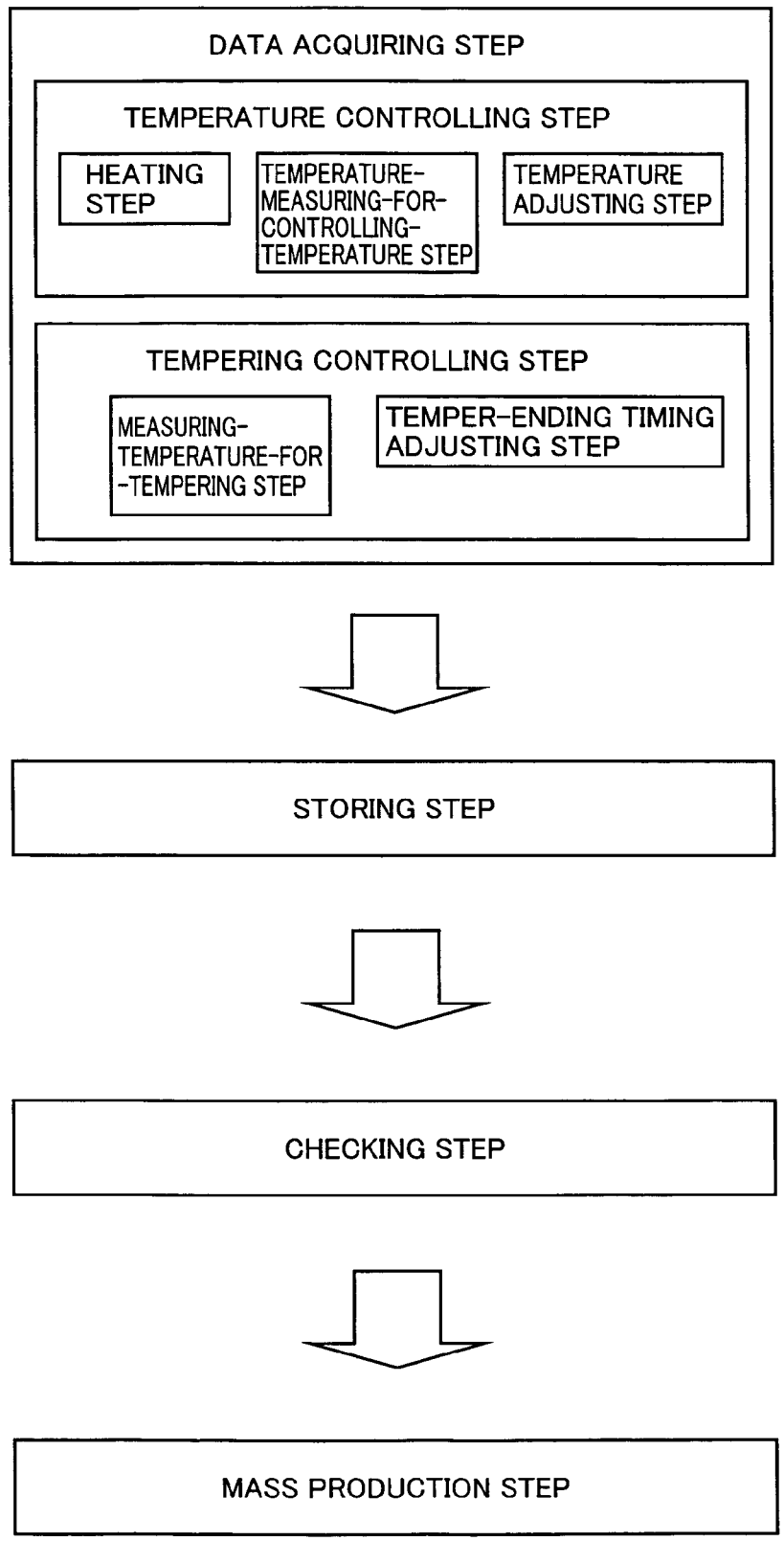
FIG. 12 shows a procedure of an induction heat treatment according to the third embodiment.

Next, referring to FIG. 12, the procedure of the induction heat treatment according to the third embodiment using the aforementioned heat treatment installation is described.

Referring to FIG. 12, the induction heat treatment method according to the third embodiment is for heating a treatment object through induction heating and tempering the treatment object, wherein, first, a data acquiring step of acquiring process data by heating and tempering a sample of a treatment object. The process data acquired in the data acquiring step is stored in a storing step. Additionally, a checking step of analyzing temperature transition data among the process data stored in the storing step and thereby determining presence/absence of the effect of disturbance for checking the validity of power supply output transition data and temper-ending timing data which are the process data stored in the storing step by analyzing temperature transition data among the process data stored in the storing step is performed.

Here, if there is the effect of disturbance, an abnormal value is recorded in the temperature transition data. Therefore, presence/absence of disturbance can be determined from the stored temperature transition data. Additionally, in order to determine more precisely, it is also possible to provide a contact type or non-contact type thermometer measuring the temperature of the same portion to determine presence/absence of disturbance based on the consistency between respective data. A specific determination scheme may be to determine that disturbance is present when the temperature difference between respective data shows at least 5%. While the determination of disturbance may be carried out by an operator checking the temperature transition data, another automated apparatus may carry out such determination. Specific examples may include a method of determining that disturbance is present when a differential value of the temperature transition of the stored temperature transition data shows at least 1000° C./sec or at most −1000° C./sec, or an apparatus wherein thermometers measuring the temperature of the same portion are provided as described above and disturbance is determined to be present when a difference of at least 5% between respective data is obtained.

Next, a mass production step is performed, wherein a power supply output is output in accordance with the power supply output transition data of which validity has been checked and tempering is ended in accordance with the temper-ending timing data of which validity has been checked.

Figure 13:
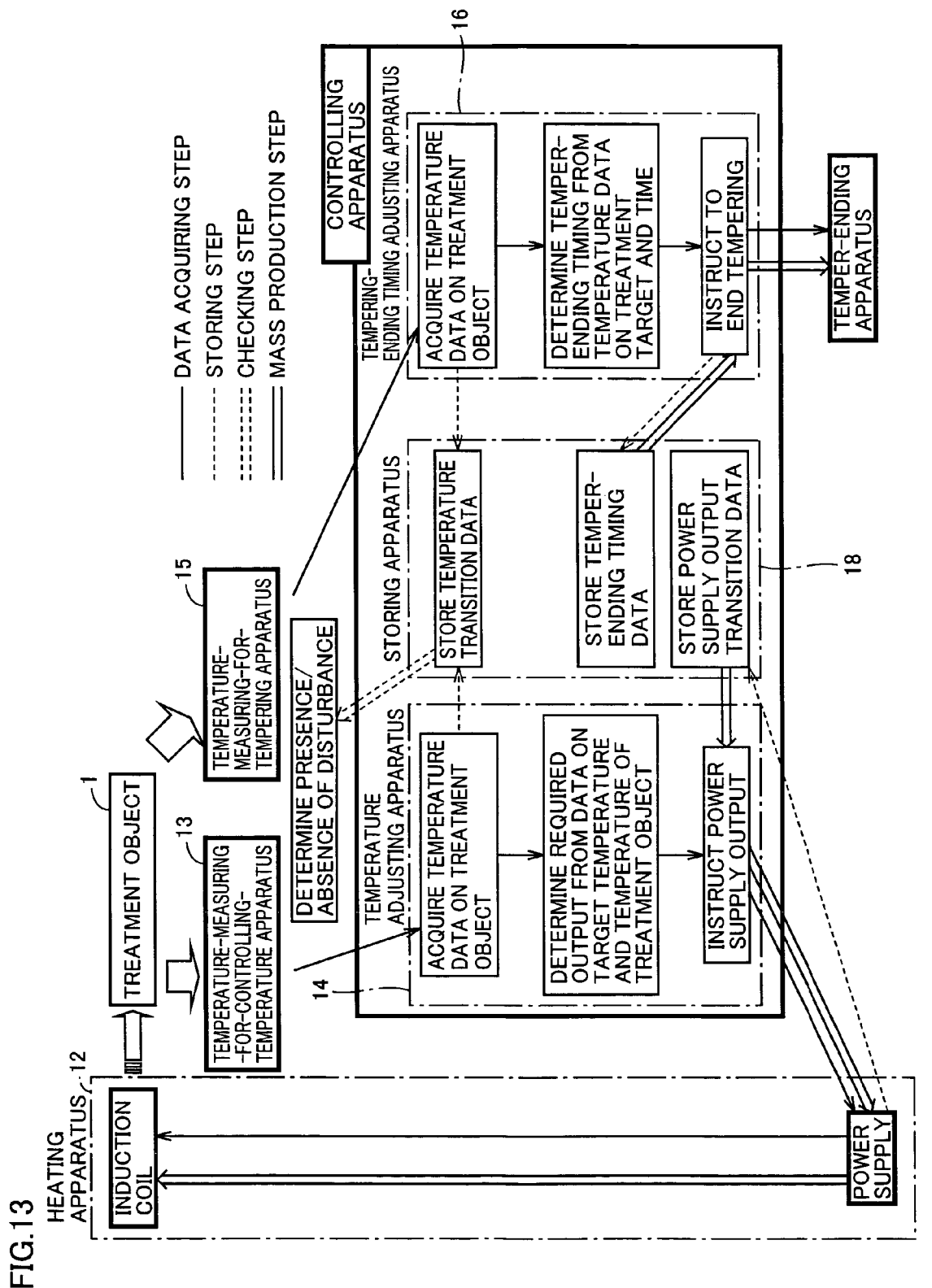
FIG. 13 shows a flow of data and instructions through each step of the induction heat treatment according to the third embodiment.

In FIG. 13, the flow of the data in the data acquiring step is indicated by a solid line arrow, the flow of the data in the storing step being indicated by a dashed line arrow, the flow of the data in the checking step being indicated by a double dashed line arrow, and the flow of data in the mass production step is indicated by a double solid line arrow. Referring to FIG. 13, the flow of data and instructions in each step of the induction heat treatment according to the third embodiment is described.

In the data acquiring step, the temperature data on the sample of treatment object 1 measured by temperature-measuring-for-controlling-temperature apparatus 13 is sent to temperature adjusting apparatus 14. Temperature adjusting apparatus 14 determines a required power supply output based on the target temperature of treatment object 1 and the temperature data on the sample of treatment object 1 being acquired, and instructs the power supply of heating apparatus 12 about a power supply output. The power supply being instructed outputs power to the induction coil of heating apparatus 12, and the sample of treatment object 1 is heated to the target temperature. On the other hand, the temperature data on the sample of treatment object 1 measured by temperature-measuring-for-tempering apparatus 15 is sent to temper-ending timing adjusting apparatus 16. Temper-ending timing adjusting apparatus 16 determines temper-ending timing based on the temperature of the sample of treatment object 1 being acquired and the heating time, and instructs a temper-ending apparatus such as coolant injecting apparatus 17 to end tempering. Thus, the sample of treatment object 1 is cooled, and tempering is ended. Here, since the data acquiring step is performed based on temperature control, heating history of the sample of treatment object 1 is clear. Therefore, as far as the temperature data is correct, a proper heat treatment is performed and the treatment object of the target quality is obtained. As a result, it is not necessary to set the condition of heat treatment while checking the quality of the treatment object, and the condition setting is easily conducted.

In the storing step, the temperature data acquired by temperature adjusting apparatus 14 and quenching timing adjusting apparatus 16 in the data acquiring step is stored in storage apparatus 18 as the temperature transition data. The power supply output from the power supply of heating apparatus 2 to the induction coil is stored in storage apparatus 18 as power supply output transition data. The timing in the instruction for ending tempering outputted from temper-ending timing adjusting apparatus 16 to a temper-ending apparatus such as coolant injecting apparatus 17 is stored in storage apparatus 18 as temper-ending timing data. Here, the temper-ending timing is stored for example as the time since heating was started.

In the checking step, for example thermometers capable of measuring the same portions as temperature-measuring-for-controlling-temperature apparatus 13 and temperature-measuring-for-tempering apparatus 15, respectively, are provided, and the temperature of the portions is measured. Based on the comparison between this measured temperature data and the temperature transition data measured by temperature-measuring-for-controlling-temperature apparatus 13 and temperature-measuring-for-tempering apparatus 15 and stored in storage apparatus 18, presence/absence of disturbance is determined.

In the mass production step, based on power supply output transition data and temper-ending timing data stored in the storing step and checked as to validity in the checking step, treatment object 1 is heated and tempering is performed. Here, the mass production step is not performed based on real-time temperature data from temperature measuring apparatuses 13 and 15 that might be affected by disturbances, but by electric power control based on the power supply output transition data and temper-ending timing data being checked as to validity. Thus, an induction-heat-treated product of a stable quality can be obtained.

It is noted that while apparatuses respectively realizing the functions of temperature adjusting apparatus 14, storage apparatus 18 and temper-ending timing adjusting apparatus 16 may be provided, such functions can be realized by a controlling apparatus such as one personal computer. The steps can be executed, for example, with a single or a plurality of program(s) corresponding to respective steps using a personal computer as a controlling apparatus.

The induction heat treatment installation of the present invention is specifically described, exemplarily showing an outer ring of 6206 type made of SUJ2 as treatment object 1. Treatment object 1 has been quenched at 850° C. in an RX gas atmosphere furnace. Here, from the viewpoint of strength, the heat treatment standard of the treatment object after tempering is defined be at least hardness HRC 58 and at most HRC 62.

The following relational expressions are satisfied among the material strength, tempering temperature and tempering time.

$$X=1-\exp\{-(kt)^N\}$$

$$k=A\exp(-Q/RT)$$

$$M=M_0-(M_0-M_f)X$$

X: rate of change in mechanical properties, k: reaction rate coefficient, t: tempering time (second), N: time index, A: vibration factor term, Q: activation energy, R: gas constant, T: tempering temperature (K), M: hardness after tempering, $M_0$: hardness after quenching, $M_f$: hardness of raw material Accordingly, from these equations, the next equation as to tempering time t can be derived.

$$t=[n\{(M_0-M_f)/(M-M_f)\}\times\{A\exp(-Q/RT)\}^{-N}]^{1/N} \quad \text{equation (7)}$$

In equation (7), hardness after quenching $M_0$ and hardness of raw material $M_f$ can be actually measured. As N, A and Q can be determined empirically, by substituting the value of tempering temperature T, tempering time t can be calculated from equation (7). The tempering time adjusting apparatus of the third embodiment is for adjusting tempering time t based on equation (7). As equation (7) is a relational expression of the heat treatment temperature and the holding time thereof as to the standard and quality of the treatment object, it can effectively be used irrespective of the type of treatment object 1.

Figure 14:
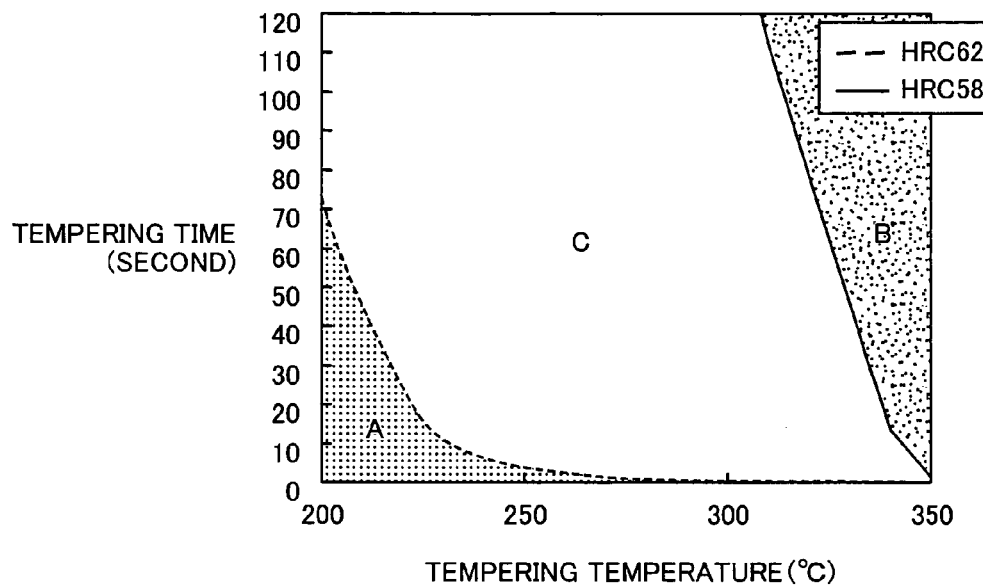
FIG. 14 is a condition diagram representing the relationship between tempering temperature and tempering time.

From equation (7) for determining tempering time t, a condition diagram showing the relationship between tempering temperature T and tempering time t as shown in FIG. 14 can be prepared. In FIG. 14, the axis of abscissa indicates tempering temperature (° C.) and the axis of ordinates indicates holding time (second). A region A represents a range of HRC 62 or more, a region B representing a range of HRC 58 or less and a region C representing a range of HRC 58-62. The tempering condition can be approximately determined from FIG. 14, and tempering can be achieved in a shorter time as the tempering temperature is higher. Accordingly, higher tempering temperature is desirable from the viewpoint of reducing the heat treatment time. However, uneven tempering due to uneven temperature is likely to occur, and therefore preferable manner is to determine the tempering temperature considering the balance between the heat treatment time and uneven tempering.

As the tempering condition is determined, as shown in FIG. 11, it is input to temperature adjusting apparatus 14 such as a personal computer. Temperature adjusting apparatus 14 is connected to temperature-measuring-for-controlling-temperature apparatus 13 and to heating apparatus 12. Based on temperature information from temperature-measuring-for-controlling-temperature apparatus 13, temperature adjusting apparatus 14 outputs a temperature controlling signal to heating apparatus 12 by PID control, and thus controls the temperature transition of treatment object 1. At the same time, temperature information of temperature-measuring-for-tempering apparatus 15 is taken into temper-ending timing adjusting apparatus 16 such as a personal computer to see if heating is sufficient based on the temperature transition to adjust temper-ending timing.

Figure 15:
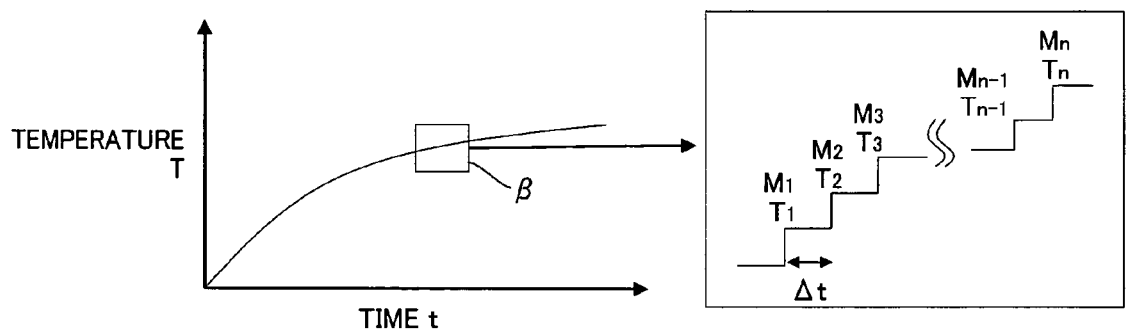
FIG. 15 is an explanatory diagram showing the relationship between tempering temperature and holding time for explaining a method for integrating values of hardness after tempering from the temperature transition.

The upper left graph of FIG. 15 indicates temperature transition, wherein the axis of abscissas represents time t and the axis of ordinates represents temperature T. The upper right diagram is an enlarged view of region β in the upper left graph. Below them, equations for integrating the value of hardness after tempering M from the temperature transition are shown.

As temperature information from temperature-measuring-for-tempering apparatus 15 changes every moment, it is desirable that the value of M (hardness after tempering) is integrated as in FIG. 15. When tempering is ended, treatment object 1 is cooled by coolant injecting apparatus 17. It is noted that a single personal computer can realize temperature adjusting apparatus 14 and temper-ending timing adjusting apparatus 16.

The heat treatment installation of the third embodiment is configured basically the same as the heat treatment installations of the first and second embodiments. Accordingly, by using a personal computer as a controlling apparatus, for example, to selectively use programs corresponding to the target heat treatment, one apparatus can realize both the induction quenching apparatus and the induction tempering apparatus.

EXAMPLE 1

In the following, Example 1 of the present invention is described. Using the induction heat treatment installation shown in FIG. 1, an induction through hardening through hardening method that is the induction heat treatment method of the present invention was conducted with JIS 6206 type bearing ring made of SUJ2 as a treatment object.

First, using a sample of 6206 type bearing ring that was the treatment object, the data acquiring step and the storing step were performed. Next, in the checking step, the validity of the process data stored in the storing step was checked, and then the mass production step was performed.

Figure 16:
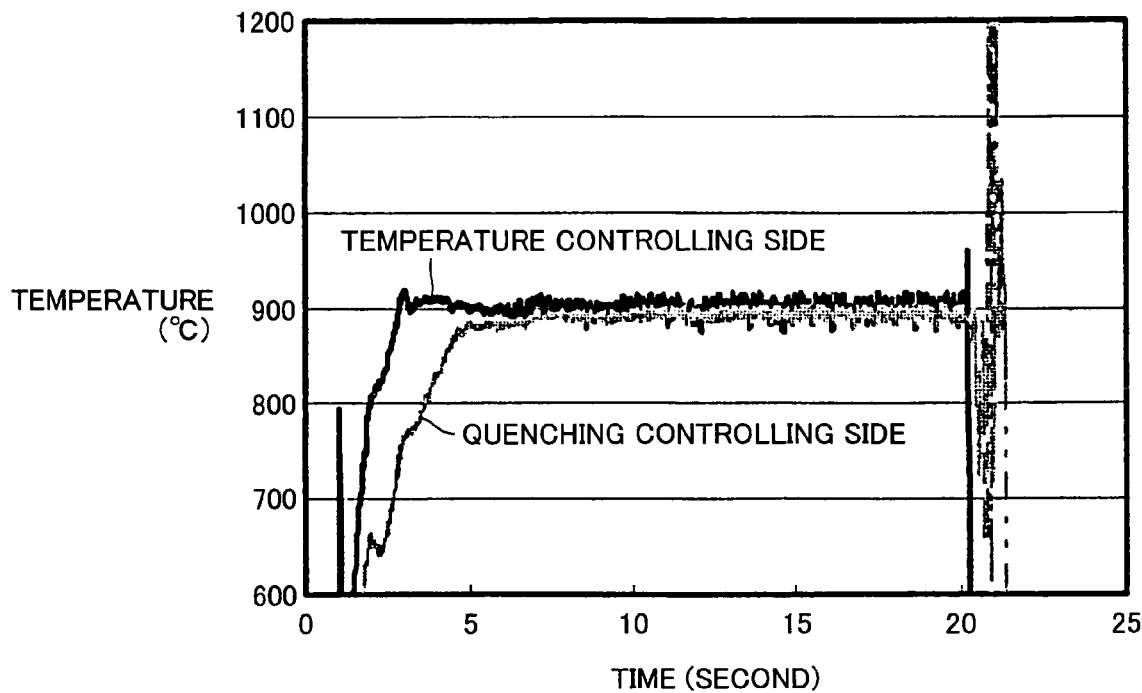
FIG. 16 is data on the treatment object temperature transition stored in a storing step when a heating condition on temperature controlling side is set to be a constant temperature of 900° C. in a data acquiring step.

In FIG. 16, the axis of abscissas indicates time (second) and the axis of ordinates indicates temperature (° C.). Referring to FIG. 16, it can be seen that the temperature on the quenching controlling side increases with slight delay from that on the temperature controlling side, and after five seconds from the start of heating, both the temperature controlling side and the quenching controlling side are kept at 900° C. that is the target temperature.

Figure 17:
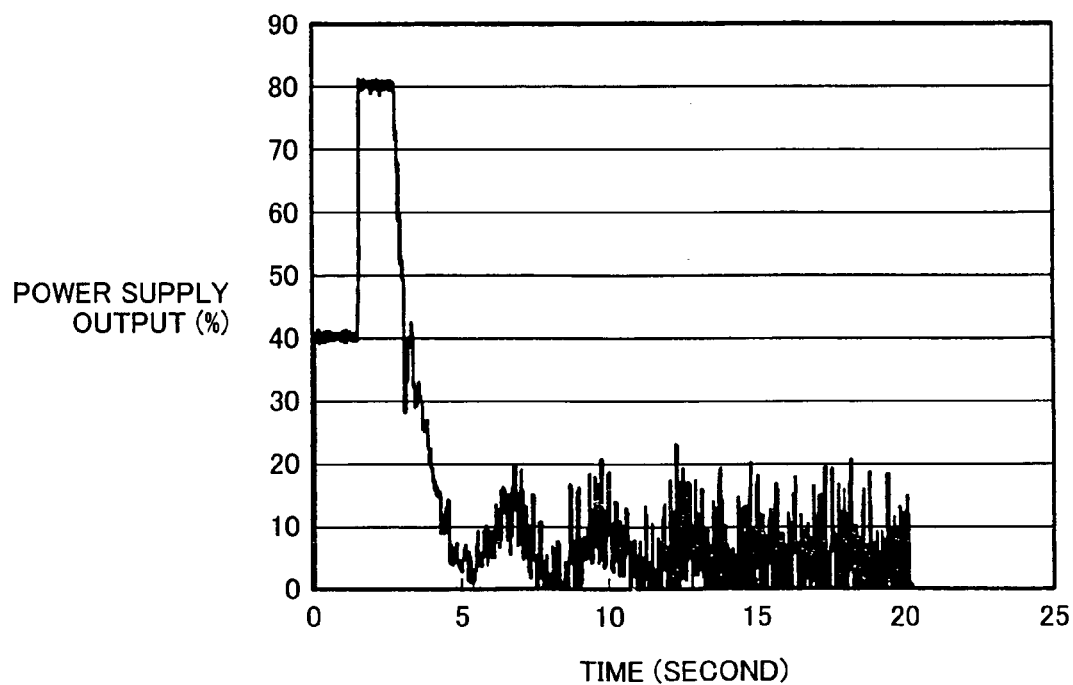
FIG. 17 is data on the power supply output transition when heating as shown in FIG. 16 is conducted.

In FIG. 17, the axis of abscissas indicates time (second) and the axis of ordinates indicates power supply output (%). As the data acquiring step was performed based on the temperature control, it can be seen that the power supply output changes in accordance with the measured temperature.

After checking in the checking step that there is no effect of disturbance based on the temperature transition data of FIG. 16, the mass production step was performed in accordance with the power supply output transition data and quenching timing data (the time elapsed since heating was started) stored in the storing step in FIG. 17.

Table 1 shows the material property data on the obtained induction quenched product (i.e., the induction hardened 6206 type bearing ring was tempered at 180° C. in the atmosphere furnace). The material property data was obtained by measuring at a plurality of portions within one quenched product and then averaging the measured values. Table 2 shows a range of variations in the material property data as to ten pieces of induction quenched products being obtained.

TABLE 1

| Heat treatment condition Maximum reached temperature (° C.) | Retained austenite quantity (mass %) | | Hardness (HRC) |
|---|---|---|---|
| | At 0.05 mm depth on outer diameter side | At 0.05 mm depth on inner diameter side | |
| 900 | 5.5 | 8.4 | 62 |

TABLE 2

| Heat treatment condition Maximum reached temperature (° C.) | Retained austenite quantity (mass %) | | Hardness (HRC) |
|---|---|---|---|
| | At 0.05 mm depth on outer diameter side | At 0.05 mm depth on inner diameter side | |
| 900 | 5.0~6.8 | 7.2~9.1 | 61.8~62.5 |

The common quality standard of SUJ2 is hardness of at least HRC 58 and retained austenite quantity of at most 12%. Accordingly, the material property of the induction quenched product obtained through Example 1 satisfies the standard. Thus, it has been confirmed that an induction quenched product without any problem in quality can be made through the induction heat treatment method of Example 1.

On the other hand, variations in hardness was about HRC 1, and variations in retained austenite quantity was about 2%. This shows that the quality of the induction-hardened product obtained through the Example 1 is stable.

EXAMPLE 2

In the following, Example 2 of the present invention is described. Using the induction heat treatment installation shown in FIG. 11, an induction tempering method that is the induction heat treatment method of the present invention was conducted with JIS 6206 type bearing ring made of SUJ2 as a treatment object.

First, using a sample of 6206 type bearing ring that was the treatment object, the data acquiring step and the storing step were performed. Next, in the checking step, the validity of the process data stored in the storing step was checked, and then the mass production step was performed.

Figure 18:
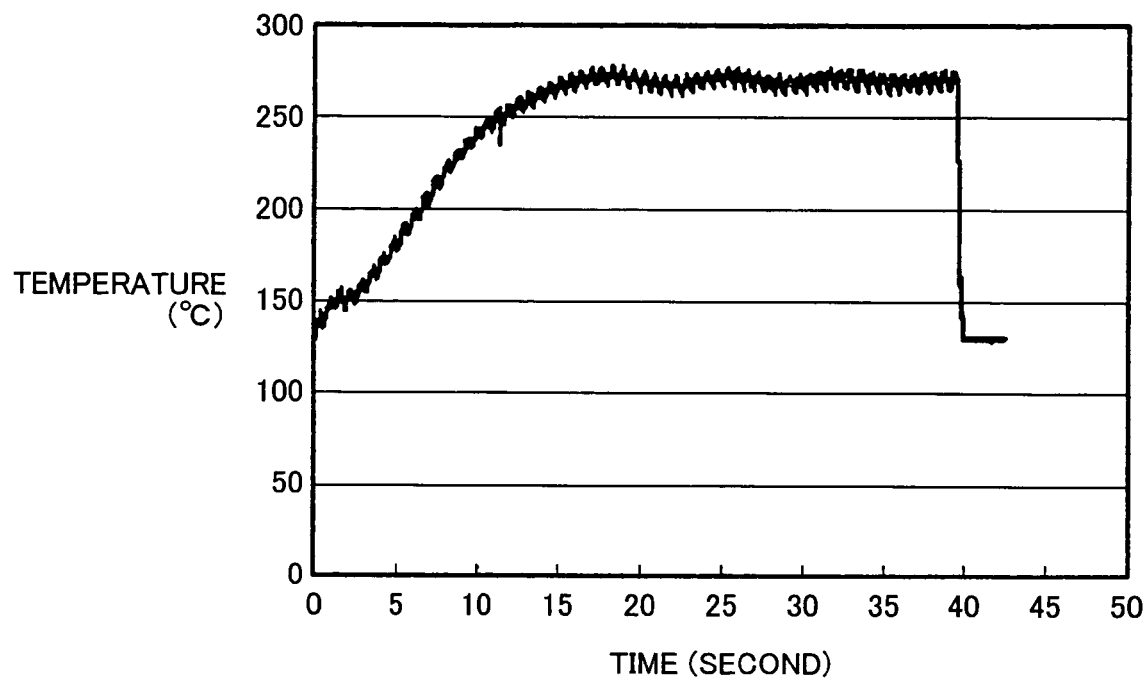
FIG. 18 is data on the treatment object temperature transition stored in the storing step when a heating condition on temperature controlling side is set to be a constant temperature of 270° C. in the data acquiring step.
Figure 19:
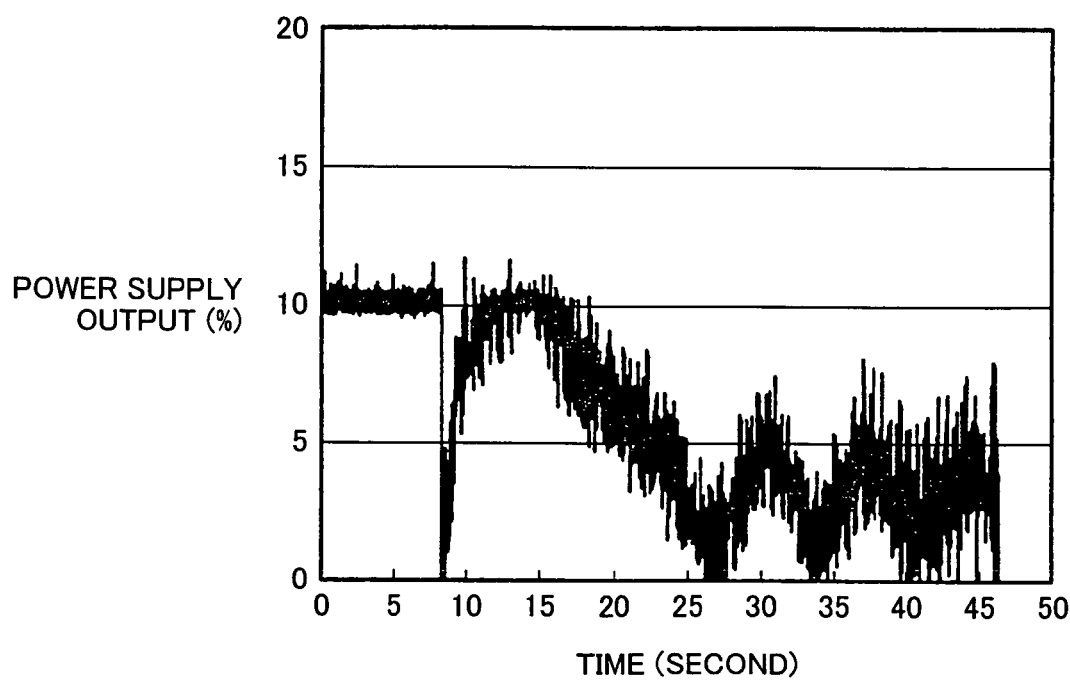
FIG. 19 is data on the power supply output transition when heating as shown in FIG. 18 is conducted.

In FIG. 18, the axis of abscissas indicates time (second) and the axis of ordinates indicates temperature (° C.). The target value of hardness after tempering was HRC62. In FIG. 19, the axis of abscissas indicates time (second) and the axis of ordinates indicates power supply output (%). As the data acquiring step was performed based on the temperature control, it can be seen that the power supply output changes in accordance with the measured temperature. As the target temperature of heating is lower than in quenching of Example 1, the output is generally low.

After checking in the checking step that there is no effect of disturbance based on the temperature transition data of FIG. 18, the mass production step was performed in accordance with the power supply output transition data and temper-ending timing data stored in the storing step in FIG. 19.

Table 3 shows the material property data on the obtained induction-tempered product (i.e., the 6206 type bearing ring, which was quench-hardened with the condition of $C_p$ value 0.7, heating temperature 850° C., heating time 60 min, and oil quenching in an RX atmosphere furnace, was induction-tempered). The material property data was obtained by measuring at a plurality of portions within one tempered product and then averaging the measured values. Table 4 shows a range of variations in the material property data as to ten pieces of induction-tempered products being obtained.

TABLE 3

| Heat treatment condition Maximum reached temperature (° C.) | Retained austenite quantity (mass %) | Hardness (HRC) |
|---|---|---|
| 270 | 4.3 | 61.8 |

TABLE 4

| Heat treatment condition Maximum reached temperature (° C.) | Retained austenite quantity (mass %) | Hardness (HRC) |
|---|---|---|
| 270 | 2.7~5.3 | 60.8~61.8 |

The material property of the induction-tempered product obtained through Example 2 satisfies the aforementioned common quality standard of SUJ2. Thus, it has been confirmed that an induction-tempered product without any problem in quality can be made through the heat treatment method of Example 2. On the other hand, variations in hardness were about HRC 1, and variations in retained austenite quantity were about 3%. This shows that the quality of the induction-tempered product obtained through Example 2 is stable.

The induction heat treatment method, the induction heat treatment installation and the induction-heat-treated product of the present invention are particularly advantageously applicable to an induction quenching (hardening) method and an induction quenching installation for heating and quench-hardening a treatment object by induction heating, and the induction hardened product, and to an induction tempering method and an induction tempering installation for heating and tempering a treatment object by induction heating, and the induction-tempered product.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An induction heat treatment method for heating and quench-hardening a treatment object through induction heating, comprising:
    a data acquiring step of heating and quench-hardening a sample of said treatment object to thereby acquire process data;
    a storing step of storing, as said process data, power supply output transition data on transition of a power supply output outputted from a power supply for induction heating to an induction coil in order to heat the sample of said treatment object in said data acquiring step, temperature transition data on transition of temperature of the sample of said treatment object, and quenching timing data for specifying a quenching timing of the sample of said treatment object;
    a checking step of checking said power supply output transition data and said quenching timing data as to validity based on said temperature transition data stored in said storing step; and
    a mass production step of performing heat treatment of said treatment object in accordance with said power supply output transition data and said quenching timing data stored in said storing step and checked as to validity in said checking step, wherein
    said data acquiring step includes
    a temperature controlling step of adjusting the temperature of the sample of said treatment object, and
    a quenching controlling step of adjusting said quenching timing, wherein
    said temperature controlling step has
    a heating step of heating the sample of said treatment object through induction heating,
    a temperature-measuring-for-controlling-temperature step of acquiring temperature data on a heated portion of the sample of said treatment object included in said temperature transition data, and
    a temperature adjusting step of outputting a temperature controlling signal to said power supply based on the temperature data acquired in said temperature-measuring-for-controlling-temperature step to control the power supply output to thereby adjust temperature for heating the sample of said treatment object, and wherein
    said quenching controlling step has
    a temperature-measuring-for-quenching step of acquiring temperature data on a portion away from the heated portion of the sample of said treatment object included in said temperature transition data, and
    a quenching timing adjusting step of adjusting a heating time based on the temperature data acquired in said temperature-measuring-for-quenching step and outputting a quench-starting signal.

2. The induction heat treatment method according to claim 1, wherein
    in said quenching timing adjusting step of said quenching controlling step, a diffusion length $D_{ep}$ of carbon for determining said quenching timing is obtained by following equations:

$$D_{ep} = A \times 2(Dt)^{1/2}$$

where D: diffusion constant of carbon in steel, t: holding time (second), A: correction coefficient;

$$D = D_0 \exp(-Q/RT)$$

where $D_0$: entropy term of diffusion constant, Q: activation energy, R: gas constant, T: absolute temperature (K); and $$\mathrm{erf}(A) = 1 - 0.1573 C_1/C_2$$

where $C_1$: solid solubility of C at 727° C., $C_2$: solid solubility of C at arbitrary temperature.

3. The induction heat treatment method according to claim 1, wherein
    in said quenching timing adjusting step of said quenching controlling step, a solution state of carbon for determining said quenching timing is obtained by following equations:

$$\partial C/(\partial t) = D \partial^2 C/(\partial x^2)$$

where D: diffusion constant of carbon in steel, C: carbon concentration (mass %), t: time (second), x: distance;

$$D = D_0 \exp(-Q/RT)$$

where $D_0$: entropy term of diffusion constant, Q: activation energy, R: gas constant, T: absolute temperature (K).

* * * * *